(12) United States Patent
Van Deloo et al.

(10) Patent No.: US 10,185,919 B2
(45) Date of Patent: Jan. 22, 2019

(54) FUNCTIONAL PORTABLE DEVICE FOR EVENT ACCESS AND DELIVERY

(71) Applicant: VISA INTERNATIONAL SERVICE ASSOCIATION, San Francisco, CA (US)

(72) Inventors: Lori Van Deloo, Los Altos, CA (US); Zack Fuerstenberg, Toronto (CA)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 1236 days.

(21) Appl. No.: 13/691,191

(22) Filed: Nov. 30, 2012

(65) Prior Publication Data

US 2013/0151292 A1    Jun. 13, 2013

Related U.S. Application Data

(60) Provisional application No. 61/569,127, filed on Dec. 9, 2011.

(51) Int. Cl.
*G06Q 30/06* (2012.01)
*G06Q 10/02* (2012.01)

(52) U.S. Cl.
CPC .................... *G06Q 10/02* (2013.01)

(58) Field of Classification Search
USPC ......... 705/5, 14.64, 39, 71, 67, 44; 709/204; 707/722; 235/380
See application file for complete search history.

(56) References Cited

U.S. PATENT DOCUMENTS 6,325,292 B1    12/2001    Serh
6,830,182 B2    12/2004    Izuyama
(Continued)

FOREIGN PATENT DOCUMENTS

DE    100 16 701 A1    10/2001
DE    1010 38 848 A1    2/2003
(Continued)

OTHER PUBLICATIONS

International Preliminary Report on Patentability for PCT/US2001/030475, dated Oct. 11, 2012. 7 pages.
(Continued)

*Primary Examiner* — Akiba K Allen
(74) *Attorney, Agent, or Firm* — Kilpatrick Townsend & Stockton LLP

(57) ABSTRACT

The utility of a portable consumer device is extended by allowing account holders the ability to gain entry into access-controlled venues using a portable consumer device that is associated with an account that was used to purchase the admission or tickets to the event at the access-controlled venue. Merchandise or other goods and services may be pre-purchased by the consumer. Pre-purchasing may occur at the time that the price of admission is paid or before entry into the venue. The portable consumer device may be validated at the entrance to the access-controlled venue. After the consumer's entry into the venue, an arrival notification alert may be triggered to provide additional goods or services. For example, when a consumer successfully enters the venue using the consumer portable device, the pre-purchased items may be delivered to the consumer location at a specific time.

18 Claims, 12 Drawing Sheets

(56) References Cited

U.S. PATENT DOCUMENTS

| | | | |
|---|---|---|---|
| 6,999,936 B2 | 2/2006 | Sehr | |
| 7,044,362 B2 | 5/2006 | Yu | |
| 7,093,130 B1 | 8/2006 | Kobayashi et al. | |
| 7,555,361 B2 | 6/2009 | Nakamura et al. | |
| 7,757,943 B2 | 7/2010 | D'Angelo et al. | |
| 2001/0056368 A1 | 12/2001 | Oguro | |
| 2002/0091555 A1 | 7/2002 | Leppink | |
| 2002/0111837 A1 | 8/2002 | Aupperle | |
| 2002/0153994 A1 | 10/2002 | Bonner et al. | |
| 2003/0171960 A1 | 9/2003 | Skinner | |
| 2004/0188520 A1 | 9/2004 | Kohta | |
| 2005/0021365 A1 | 1/2005 | Nakfoor | |
| 2005/0283594 A1 | 12/2005 | Kano | |
| 2007/0102511 A1 | 5/2007 | Park | |
| 2008/0116264 A1 | 5/2008 | Hammad et al. | |
| 2009/0188983 A1 | 7/2009 | Walker | |
| 2009/0239512 A1 | 9/2009 | Hammad et al. | |
| 2010/0070312 A1 | 3/2010 | Hunt | |
| 2010/0075638 A1 | 3/2010 | Carlson et al. | |
| 2010/0082491 A1* | 4/2010 | Rosenblatt et al. | 705/65 |
| 2010/0133339 A1* | 6/2010 | Gibson et al. | 235/382 |
| 2010/0138338 A1 | 6/2010 | Hammad et al. | |
| 2011/0040655 A1 | 2/2011 | Hendrickson | |
| 2011/0055058 A1 | 3/2011 | Hammad et al. | |
| 2011/0238454 A1 | 9/2011 | Nestor et al. | |
| 2011/0246369 A1* | 10/2011 | de Oliveira et al. | 705/64 |

FOREIGN PATENT DOCUMENTS

| | | |
|---|---|---|
| GB | 2390211 A | 12/2003 |
| JP | 2002/024464 A | 1/2002 |
| JP | 2003/006366 A | 1/2003 |
| JP | 2004/021772 A | 1/2004 |
| KR | 10-2000-0054445 A | 9/2000 |
| WO | 91/29112 | 12/1994 |
| WO | 01/84504 A2 | 11/2001 |
| WO | 2006/020820 A2 | 2/2006 |
| WO | 2006/020908 A2 | 2/2006 |
| WO | 2009/027607 A2 | 3/2009 |

OTHER PUBLICATIONS

First Examiner Report, dated Jul. 15, 2014 in Australian Application No. 2012261496, 4 pages.

Examiner's Second Report, dated May 20, 2015, for Australian Patent Application No. 2012261496, filed Nov. 30, 2012, 3 pages.

Australian Fourth Patent Examination Report in connection with Australian Patent Application No. 2012261496 dated Dec. 21, 2015, 3 pages. 13.

* cited by examiner

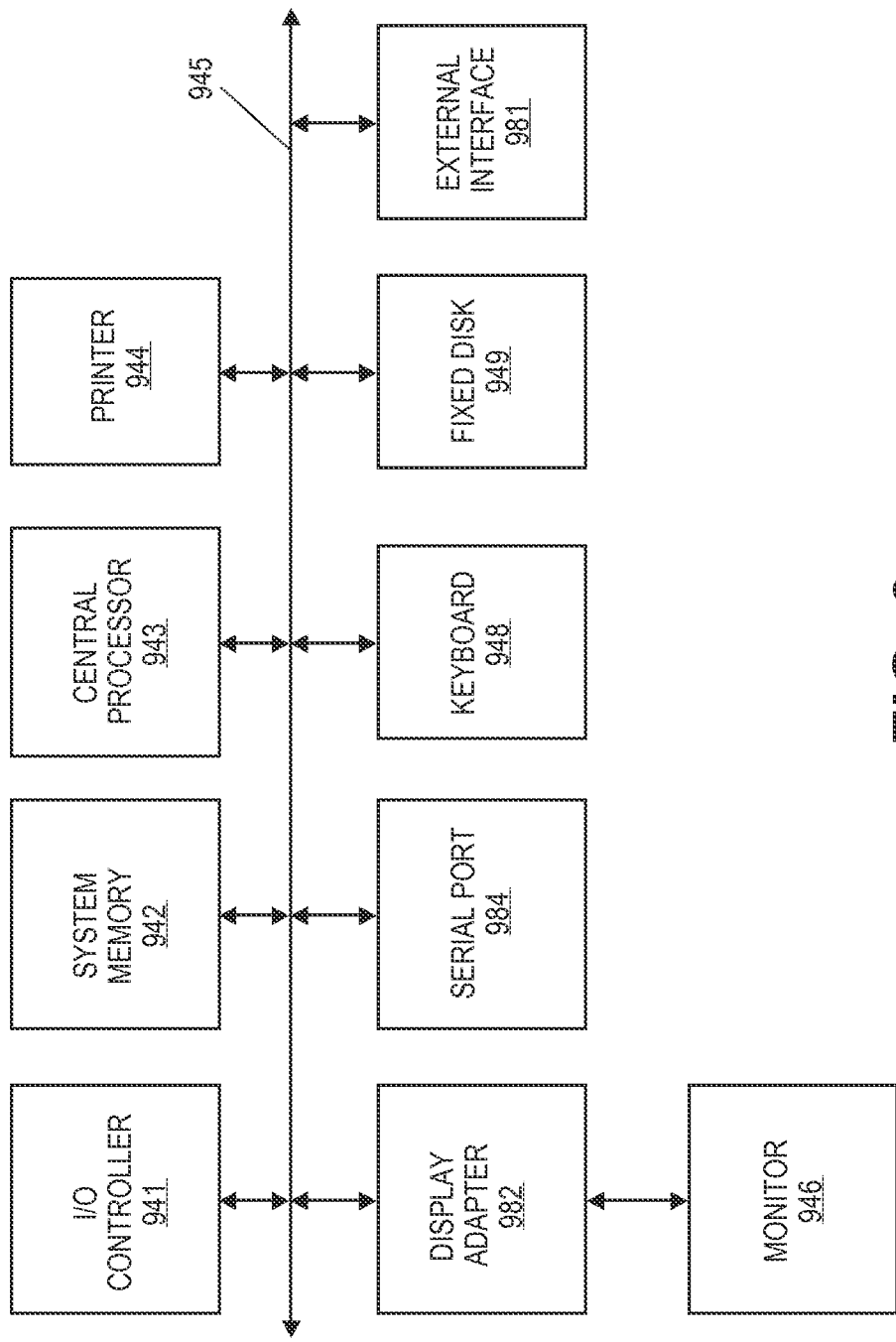

FUNCTIONAL PORTABLE DEVICE FOR EVENT ACCESS AND DELIVERY

BACKGROUND

The present disclosure relates generally to portable consumer devices that can be used for event access and delivery of goods or services.

Consumers are typically required to use paper tickets for entry to a specific event, such as a football game or the cinema, for example. Conventional paper tickets present many problems and disadvantages. For example, the use of paper tickets often requires consumers to queue up for tickets (e.g., lines at the will call window). Additionally, consumers need to worry about storing their paper tickets prior to entering the event, which is inconvenient. Conventional tickets can be lost, misplaced, or stolen. When this occurs, the consumer typically has no recourse but to buy new tickets. Furthermore, with conventional tickets, consumers may have to deal with scalpers and the risk of purchasing counterfeit tickets.

Consumers often purchase items while at the event, such as merchandise and concessions, with portable consumer devices. Indeed, merchandise and concessions are an important source of revenue. However, the lines for merchandise and concessions are often long because the event may have thousands of attendees. Extended periods of time spent searching for merchandise and concessions, or waiting in lines at the event, are inconvenient for the consumer and make the experience less enjoyable.

Limited quantities of certain merchandise are available at the event venue leading to the problem of special event merchandise selling out. For example, a concert may be a "one time only" event with limited edition merchandise specific to the event. Merchandise sellers must estimate the quantities of each type of special edition merchandise. In the case of clothing, quantities of clothes for different sizes, colors, and genders must also be estimated. Oftentimes, merchandise in a particular size or color sells out. When merchandise sells out, fans are disappointed, and revenue is lost.

Portable consumer devices, such as payment cards, may be used in lieu of conventional tickets. However, a list or database of credit card numbers (or other sensitive personal or financial information) stored at a venue or, even worse, at every entrance point to a venue may be unsecure. Additionally, the venue operator must be able to differentiate not only between a consumer associated with a payment card or payment account, but the venue operator must be able to differentiate between events to which the consumer is entitled access to, the specific date, time or showing of the event that the consumer is entitled to access, what level of access the consumer is entitled to, and/or whether the consumer pre-purchased any event merchandise or services, etc. This could be accomplished by maintaining a separate list or database of payment card numbers for each specific event. This would have the undesirable consequences of proliferating the availability of sensitive information, increasing the risk of security breaches, and making the entire system complex and unwieldy.

Embodiments of the technology disclosed herein address these and other problems, individually and collectively.

SUMMARY

Techniques for using a portable consumer device for event access in lieu of conventional tickets in order to grant entry into the venue, while protecting sensitive data, and providing for the pre-purchase of goods or services for delivery or pick-up at the venue are provided.

The utility of a portable consumer device can be extended by allowing account holders the ability to gain entry into access-controlled venues (e.g., baseball or soccer games, cinema, public transit) using a portable consumer device that is associated with a payment account that was used to purchase the admission (or "tickets") to the event at the access-controlled venue. Merchandise or other goods and services may be pre-purchased by the consumer. "Pre-purchasing" may occur at the time that the price of admission is paid or thereafter before entry into the venue. The portable consumer device may be validated at the entrance to the access-controlled venue. An arrival notification alert may be triggered, indicating the consumer has arrived and/or pre-purchased event goods or services. The arrival notification alert may be used to provide goods or services to the consumer. For example, when a consumer successfully enters the venue using the consumer portable device, the merchandise server may look up a database to determine any pre-purchased items and/or the consumer's location (e.g., seat number or location coordinates of the portable consumer device). In one embodiment, the pre-purchased items may be delivered to the consumer's seats. In one embodiment, these pre-purchased items may be delivered to the consumer location at a specific time (e.g., home team T-shirt delivered before the event starts, food delivered at half-time, etc.).

In one embodiment, a method comprises receiving portable consumer device information at an event terminal. The portable consumer device is validated based on the received information by determining whether the portable consumer device was used to purchase one or more tickets to the event. Entrance to the event is granted if the portable consumer device is validated. The step of validating may include processing the portable consumer device information by combining it with event-specific information (e.g., an event identifier) to generate validation data. In some embodiments, portable consumer device information cannot be later determined with only the validation data (e.g., validation data may be generated using a one-way function). The method further comprises determining whether the portable consumer device is associated with a pre-purchase order. The validation data may be linked to the pre-purchase order. If the consumer associated with the portable consumer device pre-purchased event merchandise or services, a notification is generated. The notification may include an identifier for the pre-purchased merchandise and/or a ticket location associated with the one or more tickets to the event.

In one embodiment, a system includes an event terminal module for receiving portable consumer device information and validating the portable consumer device if the portable consumer device was used to purchase one or more tickets to the event. The system may further include a merchandise lookup module for determining whether a consumer associated with the portable consumer device information pre-purchased event merchandise or services. The system may further include a notification generator module for generating an alert if the consumer associated with the portable consumer device pre-purchased event merchandise or services, wherein the notification comprises an identifier for the pre-purchased merchandise. The notification may include any suitable data (e.g., a ticket location associated with the one or more tickets to the event so that the pre-purchased items can be delivered).

Further details regarding other embodiments of the invention are provided below.

BRIEF DESCRIPTION OF THE DRAWINGS

FIG. 9 shows a high level block diagram of a computer system that may be used to implement a server or a terminal in accordance with an embodiment of the present invention.

DETAILED DESCRIPTION

In one embodiment, a payment card can be used to purchase admission to an event. That same payment card can be used in lieu of using a conventional ticket to get into the event; see U.S. patent application Ser. No. 13/074,245, filed Mar. 29, 2011, the contents of which are hereby incorporated by reference for all purposes. Items related to the event can be pre-ordered or pre-purchased, such as merchandise, concessions, or other items or services. The payment card can be associated with one or more paid admissions to the event and the pre-purchased items. In some embodiments, when the consumer arrives at the event entrance, the payment card used to purchase admissions and pre-ordered items can be presented (e.g., to a card reader, a turnstile, or an usher with a handheld device) for validation. After the payment card is validated, the consumer may be admitted to the event. A notification may be triggered to provision the pre-purchased items to the consumer. The notification may include a pre-order identifier, information describing the pre-order, and/or provisioning/delivery instructions. In one embodiment, the notification alerts an employee to provide the consumer the pre-purchased items at the event entrance. In one embodiment, the notification alerts an employee to deliver the pre-purchased merchandise to a seat location of the consumer. In one embodiment, the notification alerts an employee to prepare the pre-purchased items for pick-up by the consumer at another location at the venue.

Figure 1:
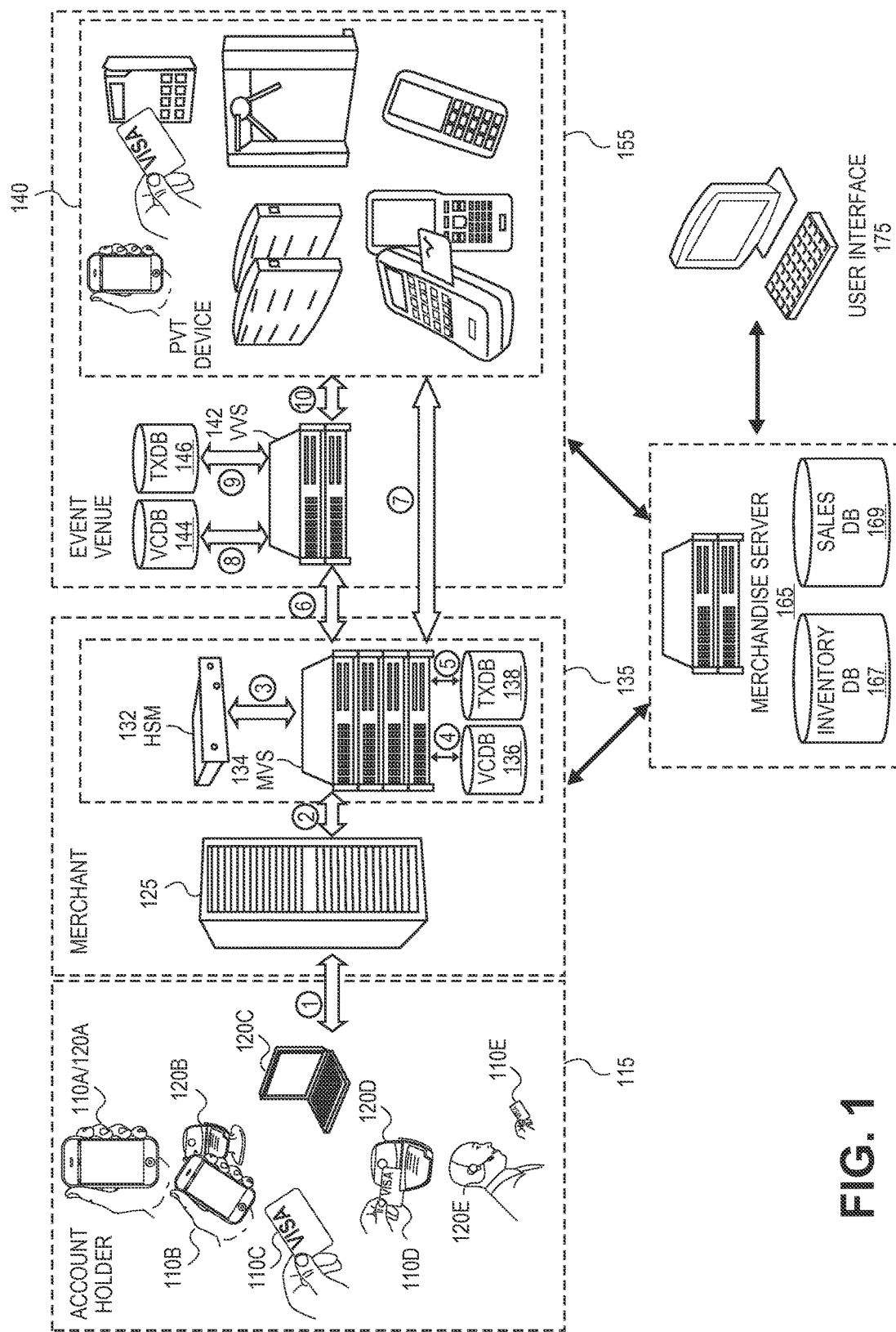
FIG. 1 is a system according to an embodiment of the invention.

FIG. 1 illustrates a diagram of a system for using a portable consumer device for access to an access-controlled venue and the provisioning of pre-purchased items. An "access-controlled venue" can refer to any location where access is limited and generally a "ticket" or other proof of payment for admission is required to gain entrance into the venue (e.g., sports stadium or arenas, movie theatres, music halls and amphitheaters, museums, amusement parks, public transit systems, etc.). An event may be any sporting, cultural, or entertainment event hosted at an access-controlled venue. For example, an event may be a sporting game or match, concert, movie, play, opera, ballet, airline flight, art display, guided tour, a hotel room reservation, or a public transit ride. The system includes an account holder interface subsystem 115, a merchant subsystem 135, a venue subsystem 155, and a merchandise server 165.

Account holder interface subsystem 115 provides an interface for an account holder to communicate and interact with a merchant. The account holder may have one or more accounts that are issued and maintained by an issuer. An issuer is a financial institution, generally a bank, which creates and maintains financial accounts. The account may be associated with a portable consumer device (e.g., 110A, 110B, 110C, 110D, or 110E).

The portable consumer device may be any payment device, such as a credit or debit card. However, the portable consumer device is not limited to conventional consumer devices; rather the portable consumer device may be any device capable of being used to make a payment. The portable consumer device can be a contact chip card, contactless chip card, smartcard, cellular phone, personal digital assistant (PDAs), payment chip, security card, access card, a device with magnetic stripe, smart media, NFC device, transponder, radio frequency identification device (RFID), and the like. Each portable consumer device may include a module, such as a computer chip with dedicated hardware, software, embedded software, or any combination thereof, that is used to perform actions associated with payment transactions. A computer-readable medium embodied by one or more memory devices may be operatively coupled to a processor.

Portable consumer devices (e.g., 110A-E) can be used to make a purchase in a payment processing network comprising a merchant, an acquiring bank, a credit card association, and an issuer. Portable consumer devices may be associated with portable consumer device information including a primary account number (PAN), credit card number, expiration date, card verification value (e.g., CVV, dCVV, CID), hardware identifier (e.g., SIM card number), or other suitable information that uniquely identifies the portable consumer device or an account associated with an issuer of a portable consumer device. In some embodiments, portable consumer device information may be stored on the portable consumer device (device-side credentials). In some embodiments, portable consumer device information may be stored in the cloud (server-side credentials). The portable consumer device may have other authentication data to identify the consumer and a payment account associated with the consumer, including account holder name, credit card account information, account number, bank identification number (BIN), credit limit, consumer information, etc.

Merchants can sell access to events or other access-controlled areas and events. Merchants can have a merchant identifier (e.g., merchant ID or MID) or other number that uniquely identifies the specific merchant. Although the term "merchant" is used, any suitable entity perform the processes described herein, including payment service providers, aggregators, third party agents, etc. For example, one party could act as a merchant of record for another party.

Admission to an access-controlled venue may be purchased via purchase terminal (e.g., 120A, 120B, 120C, 120D, and 120E). A "purchase terminal" can be any device that can be used to purchase admission, tickets, or vouchers for entry into an access-controlled venue and event merchandise, concessions, etc. For example, a purchase terminal may be an automated teller machine (ATM), point of sale (POS) terminal, mobile POS (mPOS), an electronic cash register (ECR), a kiosk, a website, a magnetic stripe reader device, a mobile device, a mobile phone, a landline phone, a personal computer, a tablet, or any other location where consumer payment devices and/or payment account numbers are accepted for payment or to conduct other financial transactions.

There are many ways the purchase terminal (e.g., 120A-E in FIG. 1) could be used to buy tickets to an event and goods/services for delivery at the event. In one embodiment, a mobile device can act as both the portable consumer device and the purchase terminal. For example, portable consumer device/purchase terminal 110A/120A may be used to purchase tickets using the Internet or an application (e.g., an "app") on the mobile device. In addition to purchasing tickets to the event, the app may also be used to purchase merchandise or other goods and services for delivery or pick-up at the event venue.

In another embodiment, a portable consumer device may be used at a merchant terminal or reader for payment (e.g., point of sale (POS) device or electronic cash register (ECR)). For example, the portable consumer device 110B may be a mobile phone associated with an account. The mobile phone may have a contact or contactless element that communicates with contact (or contactless) reader 120B. In another embodiment, the portable consumer device may be a card with a magnetic stripe 110D and the purchase terminal may include a magnetic stripe reader 120D. The purchase terminal with a magnetic stripe reader may read account information, such as a primary account number, expiration date, and/or verification value, when the card is swiped to make a purchase.

In another embodiment, the portable consumer device 110C may be a card with account information, such as a primary account number, expiration date, and/or verification value. In one embodiment, the account information may include personal information of the account holder, such as billing address, zip code, phone number, email address, initials, etc. The account information may be entered into a merchant's form on a webpage being displayed by a personal computer (PC). The PC can be the purchase terminal in this embodiment. In yet another example, the PC may include a contact or contactless reader embedded or attached to it for reading account information associated with the account. The PC may be operated by a merchant or by the account holder.

In another embodiment, the portable consumer device may be a payment card 110E and the purchase terminal may include a telephone, a merchant agent, and a merchant computer system (120E). The card holder may call the merchant agent and purchase access to a specific event or goods and services. The merchant agent may enter card holder information, such as account and personal information, and the agent may enter data for the event selected and purchased by the consumer into the merchant computer system. In yet another embodiment, purchase terminal can be a kiosk. The kiosk may be a self-service kiosk with a user interface for the consumer to use to purchase tickets or it may be operated by a merchant's agent.

Merchant subsystem 135 can operate to process paid admissions and pre-purchased items. In some embodiments, merchant subsystem 135 facilitates processing payment. In some embodiments, merchant subsystem 135 generates and stores data for later validation of the paid admissions and pre-purchased items. Merchant subsystem 135 may include a merchant validation server (MVS) 134, a merchant server 125, a host security module (HSM) 132, a validation cryptogram database 136 (or database for storage of validation data), and a transaction database 138.

Merchant validation server (MVS) 134 may be in operative communication with validation cryptogram database 136 or other suitable storage for validation data. In one embodiment, MVS 134 may generate validation data (e.g., a validation cryptogram) relating to purchased paid admission and the validation data may be stored. For example, MVS 134 can store validation cryptograms to a validation cryptogram database 136 containing valid validation cryptogram values. Validation cryptogram database 136, or data contained therein, can be distributed to the proper computer systems or devices at the event venue. Although validation cryptogram database 136 is shown, any suitable database may store validation information, which can be validation cryptograms or another type of validation data.

Merchant validation server (MVS) 134 may be in operative communication with transaction database 138. Transaction database 138 can store transaction information for the transactions that have been conducted, including transaction identifiers, what was purchased in the transactions, and related information. The validation cryptogram database and/or transaction database may contain additional information regarding the sale transaction, event options (e.g., seat assignments and other information that may be relevant for the event promoter), and/or pre-purchased items. Validation data may be linked to transaction data.

MVS 134 may include one or more host security modules (HSM) running specialized applications. MVS 134 may be compliant with the PCI DSS and PCI PA-DSS specifications. Although referred to herein as a "merchant" validation server, it is appreciated that any suitable party could operate MVS 134. The merchant may optionally operate one or more servers (e.g., merchant server 125) that interface and interact with the consumer. In other embodiments, the MVS and the merchant server may be combined into a single server or series of servers.

The venue subsystem 155 may validate access to the event and look up pre-order information. Venue subsystem 155 may include a venue validation server 142, a validation cryptogram database 144, a transaction database 146, and one or more point of validation terminals 140. Venue validation server (VVS) 142 may include one or more computers running a specialized application. VVS may validate portable consumer devices presented at the event venue. In one embodiment, VVS may validate validation cryptograms (or other validation data) against a database of valid validation cryptogram values (or other validation data) originally generated by an MVS during the payment transaction processing. In one embodiment, VVS may validate other suitable validation data originally generated by MVS during the payment transaction processing.

Point of validation terminal 140 can be located at an entrance to the event (e.g., turnstile, gate, etc.). The reader may be any suitable reader technology, such as a magnetic stripe reader, contact/contactless device reader, NFC reader, bar code reader, scanners and other similar technologies. VVS contains, or is in operative communication with, a validation cryptogram database 144 (or 136) or other suitable database with validation data. Validation cryptogram database 144 can contain a plurality of validation cryptograms that are associated with paid-for admission to an access-controlled venue. Transaction database 146 can store a log of transaction history information. In one embodiment, point of validation terminals 140 are in operative communication with venue validation server 142 and validation cryptogram database 144. In one embodiment, point of validation terminals 140 are in operative communication with merchant validation server 134 and validation cryptogram database 136. In one embodiment, the point of validation terminals 140 may locally store the cryptograms and other information necessary to validate portable consumer devices.

A merchandise server 165 may be in operative communication with merchant subsystem 135 and/or venue subsystem 155. In one embodiment, merchandise server 165 is part of merchant subsystem 135. In one embodiment, merchandise server 165 is part of venue subsystem 155. In one embodiment, merchandise server 165 comprises merchandise inventory database 167 and merchandise sales database 169. In one embodiment, venue validation server 142 and/or point of validation terminals 140 may be in operative communication with a merchandise server 165. In one embodiment, the merchandise server is in operative communication with a user interface 175, which can be used by employees at the venue.

Inventory database 167 contains information regarding the inventory of merchandise and other items available for pre-purchase and delivery at the event. In one embodiment, inventory database 167 comprises merchandise identifiers, description of the goods, SKUs (stock keeping unit) or other specific information that identifies the particular goods and services available, and quantities. In one embodiment, the inventory database may contain information describing specific types or classes of items available. For example, information regarding available sizes and colors may be stored. In one embodiment, the inventory database 167 contains information about goods and services available at specific venues and/or in specific areas or section of a particular event venue. In one embodiment, limited edition merchandise may be made available to consumers sitting in specific sections of the venue. In this circumstance, merchandise inventory database 128 may indicate that the merchandise is only available to consumers who have purchased admission to certain pre-defined sections. It is appreciated that other codes and identifiers may be used to identify and describe specific merchandise in inventory.

Sales database 169 can contain information regarding the items sold. The sales database 169 may be used to look up items purchased by a particular consumer using an identifier and/or the consumer's portable consumer device. An identifier may be correlated or linked to items pre-purchased by that consumer. For example, the identifier for the consumer may be associated with "1 Large Men's T-shirt; 1 Small Women's T-shirt; Event Program" (or an identifier for the items). Merchandise items may be identified and/or described with various other descriptive codes (e.g., size codes).

Figure 2A:
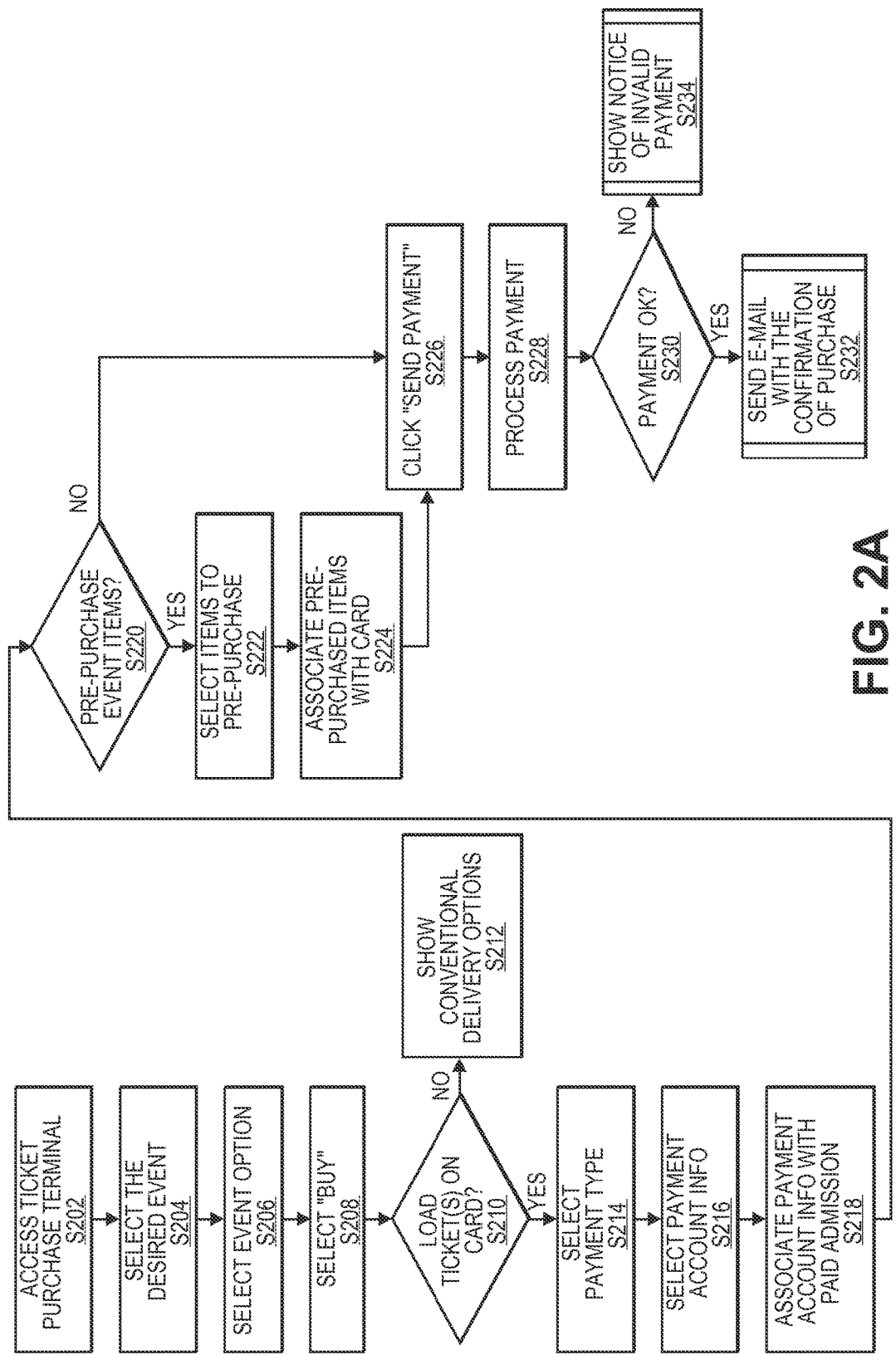
FIGS. 2A-C illustrate a method, series of user interfaces, and associated payment account data, respectively, for the purchase cycle according to embodiments of the present invention.

Examples of methods according to some embodiments of the present invention will now be described. FIG. 2A shows a high level diagram of a purchase cycle method for purchasing tickets and pre-ordering items according to an embodiment of the invention. This process can be referred to as the ticket purchase and pre-order cycle.

At step s202, a purchase terminal can be accessed to purchase paid admissions or "tickets" to an event. For example, a consumer can use a portable consumer device to pay for the cost of admission to an event to receive a "ticket." Using the purchase terminal, the desired event can be selected (s204), e.g., the event can be selected by name, time, and/or date of the event. Various event options may be selected (s206). For example, the seat location or pricing options can be selected. After selecting event and event options, the event and options can be confirmed by selecting "Buy" (s208).

At step s210, an option to load tickets onto the portable consumer device (e.g., a payment card) can be presented. If the consumer prefers conventional ticket delivery options, the process can proceed to step s212. To load ticket(s) onto the portable consumer device, the process proceeds to step s214. At step s214, a payment type can be selected, e.g., credit, debit, and/or type of credit/debit account. At steps s216, the payment account information is provided, e.g., PAN, expiration, etc.

At step s218, the payment account information can be associated with the ticket(s) and related information. In some embodiments, an alias for the payment account can be provided. In one embodiment, the payment account information is associated with the ticket(s) by generating validation data. In one embodiment, the association process includes generating a validation cryptogram, which is described with reference to FIGS. 4-6 below. In one embodiment, a payment account identifier may be associated with the tickets in a table or database file. Other validation data may be generated based on the association of payment account data and the paid admission ("ticket").

At s220, options to pre-purchase event items may be presented to the consumer. For example, consumers may pre-purchase event merchandise, concessions, food, memorabilia, or other goods and services (referred to as "event merchandise"). If the consumer declines to pre-purchase event items, the process may skip to step s226. In one embodiment, the consumer may be presented with an option to buy event merchandise. In one embodiment, the merchandise is specific to a particular event (e.g., concert t-shirts for the band or an event program). In another embodiment, the consumer may be presented with an option to buy food or other concessions.

At step s222, items for pre-purchase can be selected. In one embodiment, merchandise server 165 (FIG. 1) can determine what items are available for pre-purchase and event delivery. For example, merchandise server 165 may query inventory database 167 for available items. Available items may be presented to the consumer for selection. After the items are selected, sales database 169 is updated to reflect the transaction. For example, sales database 169 may have a list of order identifiers and associated portable consumer device identifiers (or other identifiers derived from the portable consumer device identifier). The pre-ordered items may be delivered at a specific time at a specific location at the event (e.g., food at half time of a football game or hot chocolate in the bottom of the 8$^{th}$ inning). Delivery instructions may be used to direct venue employees when, where, and how to deliver merchandise. Delivery instructions may be specified by the consumer and may be associated with the pre-order. In one embodiment, delivery instructions include a map to the location of the merchandise or the consumer's ticket location.

After the consumer selects items to purchase, the pre-purchased items are associated with the portable consumer device and/or the validation data that is associated with the portable consumer device (s224). In one embodiment, the pre-purchased items are associated with a portable consumer device identifier such as a PAN, credit card number, expiration date, card verification value (e.g., CVV, dCVV, CID), hardware identifier (e.g., SIM card number), or other suitable information that uniquely identifies the portable consumer device. In one embodiment, the pre-purchased items are associated with validation data. In one embodiment, the pre-purchased items are associated with a validation cryptogram. The association of the pre-purchased merchandise, portable consumer device, and/or other unique identifier can allow operators at the venue to deliver merchandise upon venue entry or thereafter.

At step s226, the payment can be confirmed and the payment can be processed by a payment processing network at step s228. When the consumer attempts to use the account to pay, the issuer can determine whether or not to approve or deny the authorization request message. The authorization/denial of transaction may occur by sending an authorization request message to the payment processing network and receiving an authorization response message. A response is received from the payment processing network and is evaluated at step s230. If the payment is authorized, an email or other confirmation may be sent to the consumer (s232). If the payment is denied, a notice of invalid payment may be displayed and/or sent to the consumer in an email or other message (s234).

Figure 2B:
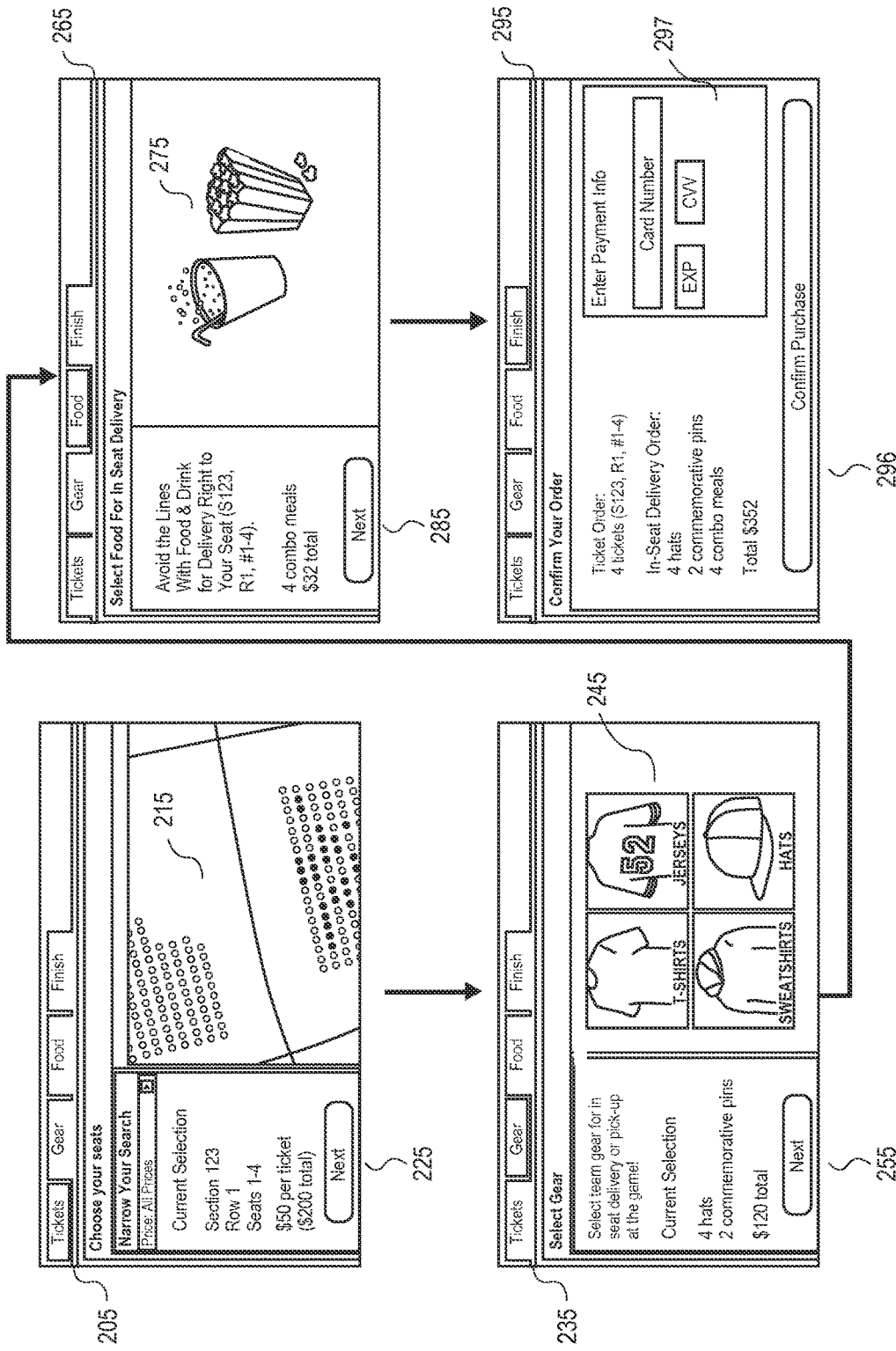

FIG. 2B shows a user interface that can be presented on a purchase terminal in accordance with an embodiment of the present invention. For example, the user interfaces (205, 235, 265, and 295) may be displayed as part of a method illustrated in FIG. 2A when the consumer purchases event admission and items. User interfaces can include folder tab indicators for navigating (e.g., "Tickets," "Gear," "Food," "Finish," etc.). User interfaces can include a portion for selecting seats, merchandise, and/or concessions. In some embodiments, user interfaces can have a progress indicator section for indicating the consumer's current selections.

In one embodiment, a ticket selection user interface 205 is provided. Ticket selection user interface 205 can include an interface for selecting a particular event. In one embodiment, the interface may allow for selecting particular seats (or type of admission) to an event. For example, ticket selection interface 205 may include a graphical portion 215 for selecting specific seats at a specific event. In some embodiments, ticket selection interface 205 may include text portion 225 indicating information about the currently selected tickets and other information. For example, user interface 205 indicates the current selection is 4 tickets (Section 123, Row 1, Seats 1-4) for $50 each.

In one embodiment, a merchandise selection user interface 235 is provided. Merchandise selection user interface 235 can include an interface for selecting merchandise, including sizes, colors, and quantities of merchandise to pre-purchase. For example, merchandise selection interface 235 may include a graphical portion 245 for selecting specific merchandise (e.g., shirts, hats, sweatshirts, jerseys, etc.). In another example, services would be selecting using the selection interface 235 (e.g., parking at the event). In some embodiments, merchandise selection interface 235 may include text portion 255 indicating information about the currently selected merchandise, totals/subtotals, and other information.

In one embodiment, a concession selection user interface 265 is provided. Concession selection user interface 265 can include an interface for selecting concessions to pre-purchase. For example, merchandise selection interface 265 may include a graphical portion 275 for selecting specific concessions (e.g., hot dogs, soda, etc.). In some embodiments, concession selection interface 265 may include text portion 285 indicating information about the currently selected concessions, totals/subtotals, and other information.

In one embodiment, a payment confirmation user interface 295 is provided. Payment confirmation user interface 295 can include a portion for entering payment account data for a portable consumer device 297, an order summary portion 296, and an option to confirm the purchase. In response to a consumer purchase confirmation (e.g., by the consumer selecting "Confirm Purchase"), a portable consumer device can be associated with one or more paid admissions (e.g., s218 in FIG. 2A) and the pre-purchased items may be associated with the portable consumer device (e.g., s224 in FIG. 2A). In some embodiments, pre-purchased items are associated with validation data associated with the paid admissions.

Figure 2C:
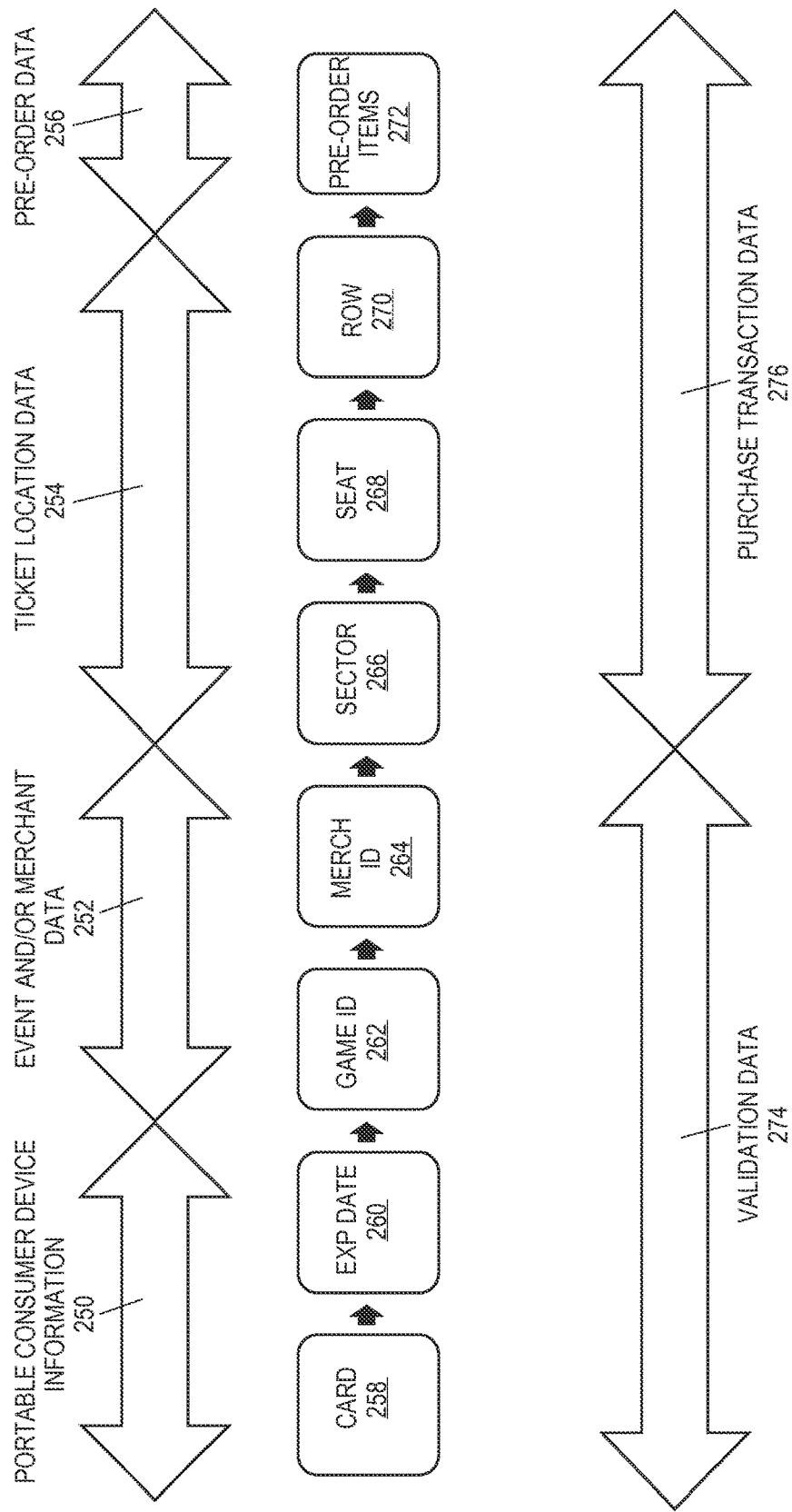

FIG. 2C is a block diagram of how a portable consumer device can be associated with paid admissions and pre-purchased items according to one embodiment of the present invention. In one embodiment, the portable consumer device may be a payment card. The step of associating the card with one or more paid admissions to create validation data may include combining and processing portable consumer device information 250 with event data 252. In one embodiment, portable consumer device information 250 includes a payment account number 258 and an expiration date 260. In one embodiment, event and merchant data may include a game (or event) identifier 262 and a merchant identifier 264. Portable consumer device information 250 and event data 252 may be combined to generate validation data 274. Validation data 274 may be stored in a database and used at the event venue for validating whether or not a consumer in possession of the portable consumer device can access the event. In some embodiments, validation data may be a validation cryptogram generated as described herein.

Validation data 274 may be linked to purchase transaction data 276. Purchase transaction data can describe what the consumer is entitled to (based on the purchase) in terms of seat location and pre-ordered items. In one embodiment, ticket location data 254 includes information identifying the location of the tickets purchased by the consumer and associated with the portable consumer device. For example, the ticket location data may comprise a section/sector identifier 266, a seat identifier 268, and a row identifier 270. Pre-order data 256 may include identifiers for pre-ordered items 272 that were purchased in the same transaction as the paid admissions were purchased. In some embodiments, pre-purchase options may be presented at time after the initial admission purchase transaction. For example, admissions may be purchased and associated with a card, and later pre-purchase items may be purchased and associated with the card.

In one embodiment, validation data 274 and purchase transaction data 276 are linked so that when a particular portable consumer device is presented at the event, paid admissions can be validated based on the validation data, ticket location may be determined based on the purchase transaction data and/or validation data, and pre-ordered items can be provisioned based on the purchase transaction data.

Figure 3A:
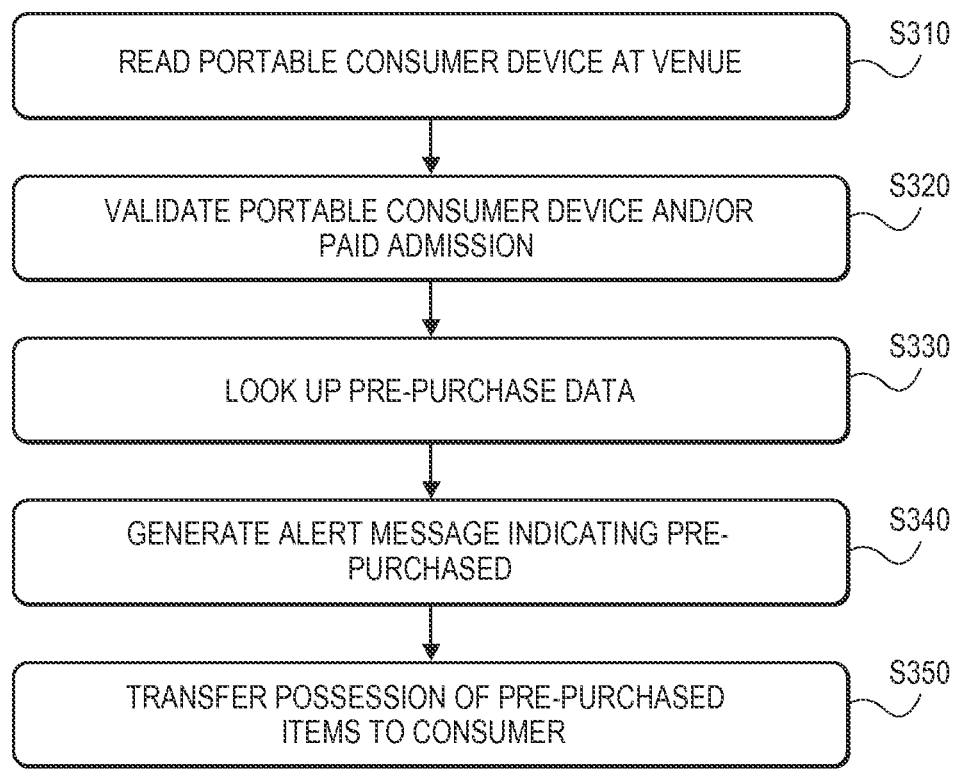
FIGS. 3A-B illustrate a method and system for the validation cycle at an event venue according to embodiments of the present invention.
Figure 3B:
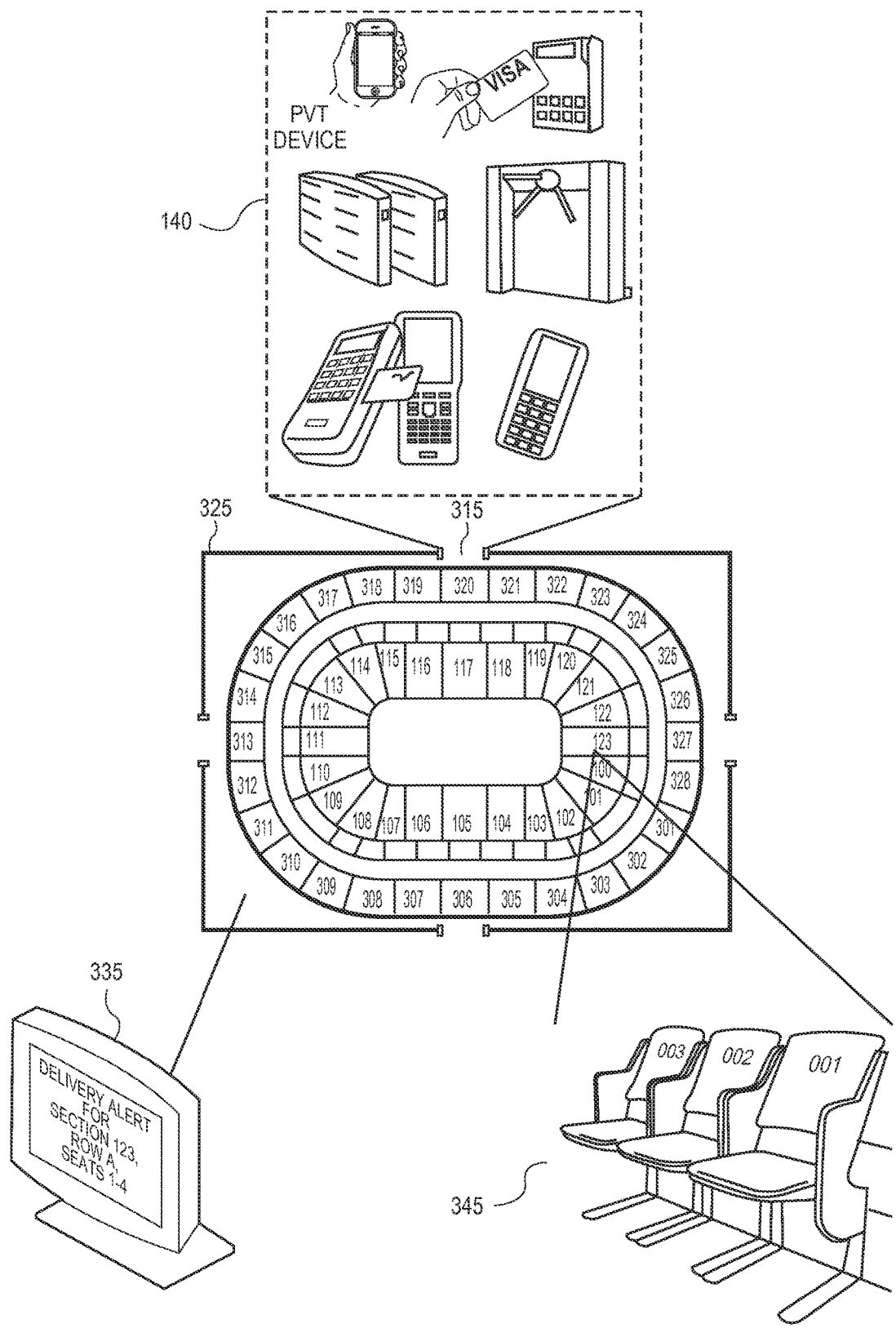

FIGS. 3A and 3B illustrate a method of, and a system for, using a portable consumer device for venue admittance and delivery of pre-ordered merchandise, respectively, according to embodiments of the invention. This process can be referred to as the admission validation and pre-order delivery cycle.

At s310, the portable consumer device can be read at the venue using a point of validation terminal. For example, point of validation terminals (e.g., 140) may be located at various venue entrances (e.g., gate 315 at venue 325 in FIG. 3B). In one embodiment, the point of validation terminal reads portable consumer device information, such as a PAN, credit card number, expiration date, card verification value (e.g., CVV, dCVV, CID), hardware identifier (e.g., SIM card number), or other suitable information that uniquely identifies the portable consumer device. In one embodiment, the point of validation terminal can be used to input portable consumer device information manually, by either the consumer or an agent.

At s320, the portable consumer device is validated based on the information read in step s310. In some embodiments, the portable consumer device is also validated based on event-specific information. In one embodiment, validating the portable consumer device includes determining whether the portable consumer device is associated with a valid paid admission to the event. In one embodiment, the validation of the portable consumer device includes generating a validation cryptogram and comparing the generated validation cryptogram to a list of stored validation cryptograms. Generating validation cryptograms are described with reference to FIGS. 5-6. It is appreciated that other suitable methods of validating the portable consumer device may be used.

An access permissions message can be generated at step s320. Either the point of validation terminal, venue validation terminal, and/or merchant validation terminal may generate this message or portions of this message. The access permissions message may indicate whether or not admission is permitted. In one embodiment, the access permission message may contain an instruction to open a physical barrier (such as a gate or turnstile) coupled to the point of validation terminal. In one embodiment, a display on the point of validation terminal may display an access granted message to an usher, and the usher may allow the appropriate number of people entry. The display may also show seating information, such as section, seat, and/or row number. In one embodiment, a printer is coupled to the point of validation terminal. The printer may print a receipt with seating information.

At s330, pre-purchase data is looked up. In one embodiment, the portable consumer device information read in step s310 is used to look up pre-order information associated with the portable consumer device. In one embodiment, the pre-order information may be associated with a portable consumer device identifier. In one embodiment, the pre-order information may be associated with a validation cryptogram or other validation data. For example, portable consumer device identifier or validation cryptograms may be linked to pre-order information associated with the portable consumer device. A printer coupled to the point of validation terminal may print a receipt with pre-order information.

At s340, an arrival/delivery alert can be generated when it is determined that pre-order merchandise is associated with the portable consumer device and/or paid admission. The alert may be displayed on a computer (e.g., 335) or handheld device. The arrival alert may contain information that can be used to identify the consumer (e.g., by name and/or seat location) and identify the pre-purchased merchandise.

In one embodiment, upon receipt of arrival notification message, the merchandise server may confirm that the merchandise pre-ordered is in stock and display a delivery alert on a user interface (335) operated by a venue employee. The user interface may display quantities, sizes, delivery instructions, such as the consumer seat location, and other information. For example, an alert may specify the information 4 hats and 2 commemorative pins (e.g., the merchandise pre-ordered in FIG. 2B) should be provisioned to the consumer at the entrance to the venue. In another example, the alert may specify that 4 meal combos should be delivered to the consumer's ticket location (section 123, row A, seat 1) at the beginning of halftime. After receiving and/or viewing this alert, a venue employee may use the delivery information to gather the merchandise and deliver it to the consumer in accordance with any delivery instructions.

Thereafter, at s350, possession of the pre-purchased items can be transferred to the consumer. In one embodiment, transfer of possession may occur by delivery of the pre-purchased items to the consumer by an employee of the venue. For example, the pre-purchased items can be delivered directly to the consumer's seat location (345) as indicated by the alert generated by computer 335. In one embodiment, transfer of possession may occur at the venue entrance. In one embodiment, the transfer of possession may occur at a kiosk or vending machine. Many other variations of the pre-purchase and delivery of the pre-purchased items are possible without departing from the scope of the present disclosure. For example, in another embodiment, the portable consumer device is read at a self-serve kiosk or a vending machine at the venue that is not located near the entrance (e.g., more than 100 yards away). In one embodiment, the portable consumer device is read at a kiosk operated by a venue employee. In one embodiment, the kiosk or vending machine can be used to deliver pre-ordered merchandise only (and not for general purchases at the venue), and therefore usually has a shorter line than a general concession or memorabilia stand. After the portable consumer device is read, alerts can be generated and pre-ordered items delivered, as discussed above.

Validation Cryptogram Generation

Figure 4:
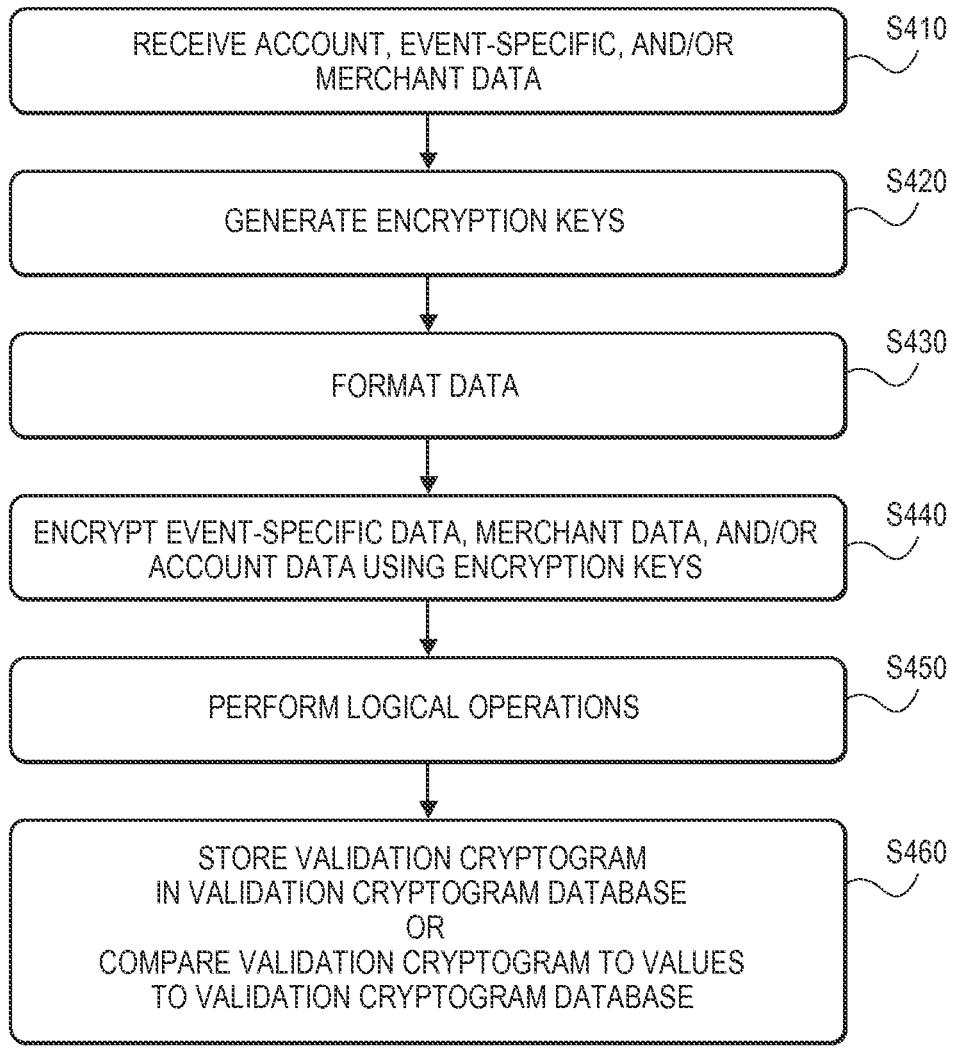
FIG. 4 illustrates a method of generating a cryptogram as part of the purchase or validation cycle according to an embodiment of the present invention.

FIG. 4 shows a high level diagram of a method for generating a validation cryptogram. Validation cryptograms are one example of how a portable consumer device can be validated as being associated with one or more paid admissions to an event. One having skill in the art will recognize that other validation data can be used.

A "cryptogram" is a code or cipher, such as a representation having a secret meaning. A "validation cryptogram" is a cryptographic token value. In one embodiment, a validation cryptogram may be an encrypted value, generated using an encryption algorithm and a key. In one embodiment, a validation cryptogram may be a hash value. A first validation cryptogram may be generated in the purchase cycle by the merchant validation server. A second validation cryptogram may be generated in the validation cycle by either a point of validation terminal or a venue validation server. If the first and second cryptograms match, or are sufficiently close, the access is validated. Validation cryptograms may be linked to pre-orders so that a pre-order may be looked up using a validation cryptogram. The following steps may be performed in any suitable order, and in certain embodiments one or more of the steps may be omitted.

At s410, a merchant validation server or a venue validation server receives account data, event-specific data, and/or merchant data. Account data may be a PAN, expiration date, verification value, etc. Each event available for purchase may have event-specific information. "Event-specific data" or "event-specific information" is any data that describes an event (e.g., a unique event identifier), event location, event performer, event date, event start time, event end time, or any other information that describes the event. An "event-identifier" may refer to an alphanumeric representation that uniquely corresponds to a particular event.

For example, in the transit context, event-specific data could be an airline flight number/identifier, airport gate number/identifier, or train number/identifier. Event-specific information may also include the plane, train, or subway departure or arrival time and/or arrival or departure location(s). In an entertainment or sporting context, event-specific information may include the location of the venue, a section/row/seat number or identifier, schedule start and end time(s) for the event, or an identifier for the performer(s), performance(s), or team(s) playing. In a movie cinema context, where there are multiple showings of the same movie on one or more screens, the event-specific information may be unique per movie (i.e., "The King's Speech" or an alphanumeric identifier for that movie), unique per screen (i.e., screen X), and/or unique per time slot (i.e., 7:00 PM showing).

At s420, the merchant validation server generates encryption keys. In one embodiment, a host security module (HSM) is used to generate encryption keys. At s430, the account data, event-specific data, and/or merchant data may be formatted using logical operations, concatenation, etc.

At s440, the account, event-specific, and/or merchant data are encrypted using the encryption keys. Then, that combination may be encrypted with a key. At s450, logical operations (e.g., XOR) may be performed to combine data. Steps s440 and s450 may be repeated for each type of input data (account, event-specific, and/or merchant data), and the encryption step may comprise a series of encryption steps, as described in further detail below. For example, account data may be encrypted using an encryption key, and the output of that encryption may be combined with event-specific data. At s460, the validation cryptogram is either (a) stored in a validation cryptogram database, if the cryptogram was generated as part of the purchase cycle, or (b) compared to values in a validation cryptogram database, if the cryptogram was generated as part of the validation cycle.

Figure 5:
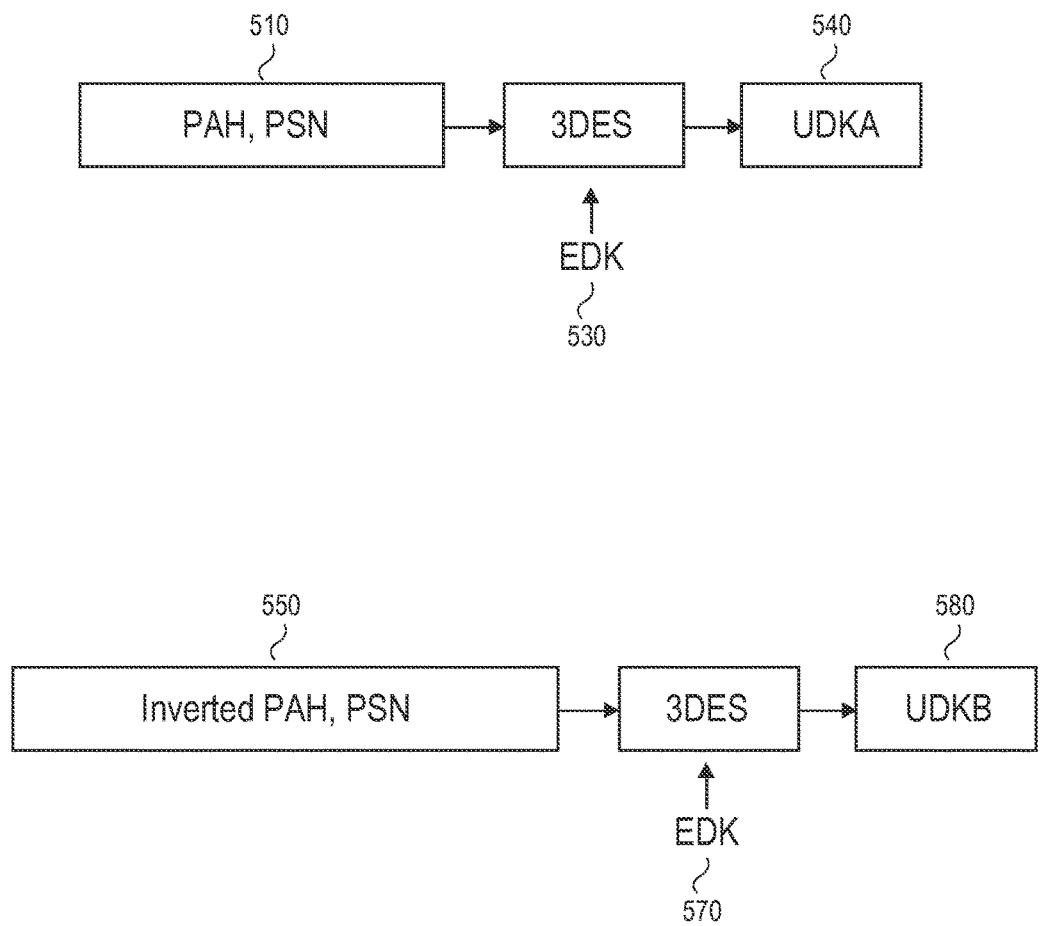
FIG. 5 shows a diagram of a method of generating keys in accordance with an embodiment of the present invention.
Figure 6:
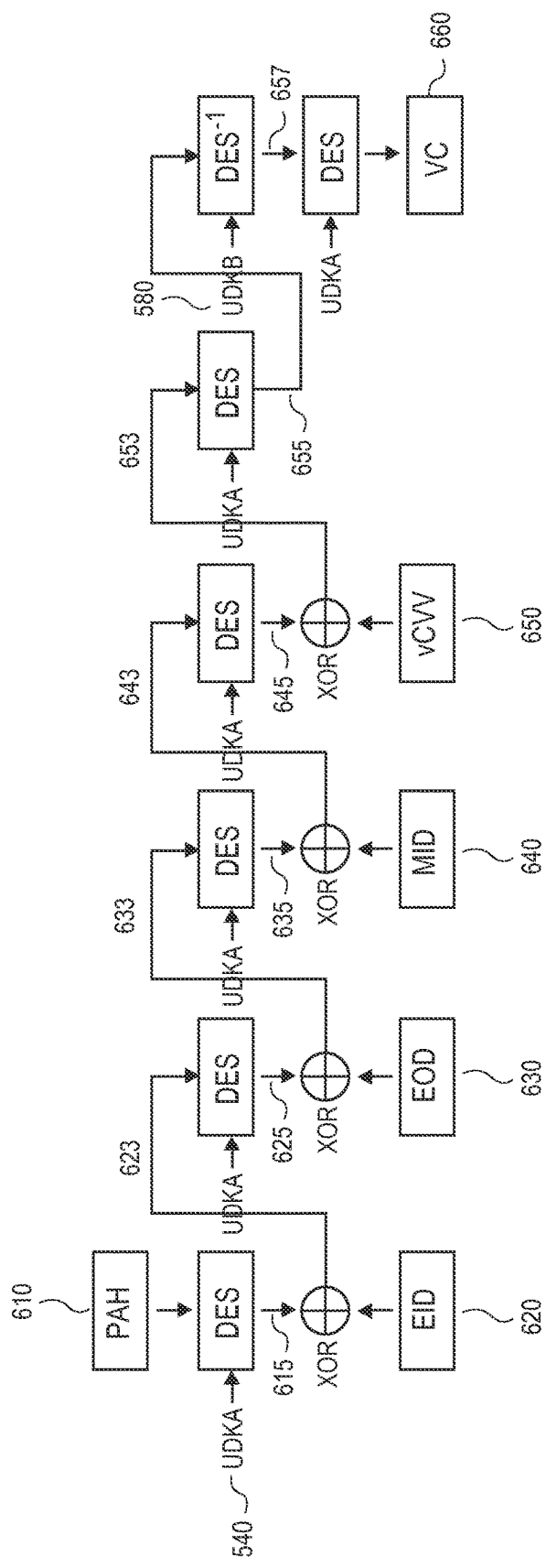
FIG. 6 shows a diagram of a series of inputs and operations for generating a cryptogram in accordance with an embodiment of the present invention.

FIGS. 5-6 show generating a validation cryptogram and unique keys for use in generating the validation cryptogram according to embodiments of the present invention. The generation for validation cryptograms can occur as part of the purchase cycle by the merchant subsystem or the validation cycle at the event venue. Specifically, FIG. 5 shows one embodiment of a derivation of unique keys. Any suitable encryption algorithms may be used, such as DES, triple DES (3DES), AES, etc. Keys may be based on any suitable data. In the embodiment shown in FIG. 4, the derivation method of unique 3DES keys utilizes a primary account number (PAN), a primary account hash sequence number, and an event derivation key (EDK).

In one embodiment, the primary account number (PAN) is used as input to a hashing algorithm, such as the SHA-2 set of cryptographic hash functions. A hash function or algorithm is any well-defined procedure or mathematical function that converts a large, possibly variable-sized amount of data into a small datum. Hash functions may produce a fixed length output. For example, SHA-2 consists of a set of four hash functions with digests that are 224, 256, 384 or 512 bits (respectively, SHA-224, SHA-256, SHA-384, SHA-512), designed by the National Security Agency and published by the NIST as a U.S. Federal Information Processing Standard. However, any suitable hashing functions may be used. Using a hash is desirable because it takes the PAN and changes it to a fixed length output. In one embodiment, SHA-256 may be used to generate a fixed length (256-bit) output.

In one embodiment, a primary account hash (PAH) may be calculated as follows:

PAH=(C Left 128 bit Block)XOR(C Right 128 bit Block)

Where C=SHA-256 (Primary Account Number)

Any suitable representative of the PAN may be used, as it is beneficial to obscure the PAN for security reasons.

A primary account hash sequence number (PSN) may be used to differentiate a primary card from an additional card on the same account. In some embodiments, the PSN is set to "00" for the purposes of the key derivation method described herein.

An event derivation key (EDK) is a cryptographic salt value (i.e., a random number used as input in a key derivation function). The EDK may be generated by an MVS HSM and used in the validation cryptogram calculation. The EDK may be unique per event. That is, each event may have an event-specific key. In one embodiment, the EDK is generated by an MVS HSM internal random number generator. In one embodiment, the EDK is a 32-byte cryptographic salt value. Once generated, the EDK may take part in the validation cryptogram calculation. The EDK may be securely stored into the point of validation terminal (PVT) internal crypto-processor memory prior to the event start. This secure storage may be accomplished through an initialization transaction when the PVT would download all necessary configuration parameters from the MVS and/or from the venue validation server (VVS). The EDK may come from the HSM through the MVS.

Two keys, UDKA 540 and UDKB 580, may be derived from the EDK 530/570, PAH, and PSN. To generate UDKA 540, as shown in FIG. 5, the PAH and PSN may be concatenated or otherwise combined (510). The combined PAH-PSN may be encrypted using 3DES and the EDK 530. The output of the 3DES encryption algorithm is UDKA 540. To generate UDKB, the bits of the PAN may be inverted and concatenated with the PSN (550). The combined inverted PAN-PSN may be encrypted using 3DES and the EDK 570, which may be the same as EDK 530. The output of the 3DES encryption algorithm is UDKB 580.

In other embodiments, the derivation of UDKA 540 and UDKB 580 from the EDK 530/570 may take any form, including assigning the value of the leftmost half of the EDK to UDKA 540, and assigning the value of the rightmost half of the EDK to UDKB 580. Alternatively, the UDKA 540 may be derived by selecting alternating or other predetermined bit sequences from the EDK while the remaining bits are assigned to UDKB 580. Furthermore, there is no requirement that UDKA and UDKB are of equal length.

UDKA 540 and UDKB 580 may then be used in the cryptogram generation shown in FIG. 6. Cryptogram inputs may be used to generate a validation cryptogram 660. Cryptogram inputs may include account information (PAN, PAH, expiration date, verification value), event information (event identifier, event original date), transaction-specific data, and/or merchant information (merchant identifier). FIG. 6 shows one embodiment; the cryptogram inputs, encryption order, and logical operations performed may vary without departing from the scope of the disclosure.

Primary account hash (PAH) 610 may be derived from a primary account number (PAN), as described above. The PAH 610 may be any suitable length, and is preferably 256 bits when SHA-256 is used. Using UDKA 540 as an encryption key and DES (or other suitable encryption), the PAH 610 is encrypted to generate a first encrypted output 615.

A logical operation is then performed on the first encrypted output 615. In one embodiment, the logical operation is an exclusive-or operation (XOR) with the event identifier (EID) 620. The result is first XOR output 623. The first encrypted output 615 and the EID 620 may be the same length or different lengths. In the event that the lengths are different, zeros may be added to pad the beginning or end of the shorter of the first encrypted output 615 or EID 620.

The first XOR output 623 is encrypted using UDKA 640 as the encryption key and DES to produce a second encryption output 625. A second exclusive-or operation is performed on the second encryption output 625 with an event original date (EOD) 630. The EOD does not change even if the event is to be postponed or changed to a different date. It is beneficial to include EOD rather than, or in addition to, the actual event date so that the validation cryptograms can be properly matched even if the event date is changed or postponed. In some embodiments, other date information may be used. Again, zeros may be added to pad the shorter of the two inputs to the exclusive-or operation. The result is second XOR output 633.

The second XOR output 633 is encrypted using UDKA 640 as the encryption key and DES to produce a third encryption output 635. A third exclusive-or operation is performed on the third encryption output 635 with merchant identifier (MID) 640. In some embodiments, other merchant information may be used (e.g., merchant phone number, address, tax ID). The result is third XOR output 643.

The third XOR output 643 is encrypted using UDKA 540 as the encryption key and DES to produce a fourth encryption output 645. A fourth exclusive-or operation is performed on the fourth encryption output 645 with a validation card validation value (vCVV) 650, which is described in more detail below. The result is a fourth XOR output 653.

The fourth XOR output 653 is encrypted using UDKA 540 as the encryption key and DES to produce a fifth encryption output 655. The fifth encryption output 655 is "decrypted" using UDKB 580 and reverse-DES ($DES^{-1}$) to generate decrypted output 657. The decrypted output 657 is then encrypted using UDKA 540 and DES to produce a validation cryptogram (VC) 660.

It should be noted that any of the steps described in FIG. 6 could be performed in any order. Furthermore, the length of inputs to any encryption or logical operation step (e.g., PAH, EID, EOD, MIC, vCVV, etc.) may be any suitable length. Zeros may pad any input that is shorter. While DES and $DES^{-1}$ are shown, it is appreciated that any suitable encryption/decryption algorithm may be used. Similarly, while an exclusive-or logical operation (XOR) is shown, it is appreciated that other logical operations may also suffice (AND, OR, NOR, XNOR, NAND, etc.). Furthermore, instead of an exclusive-or operation for combining any two values, concatenation may be used. Concatenation may be used in combination with a logical operation.

It should also be noted that additional data may be encrypted and comprise the validation cryptogram. For example, a transaction-specific number from the merchant or payment network may be used to generate a validation cryptogram. In one embodiment, the transaction-specific number is an authorization code from a payment processing network. The authorization code may be encrypted and XOR'ed with any of the above. In one embodiment, an authorization code might replace vCVV (650), MID (640), or any other suitable input. Additionally, partial cryptograms and/or multiple cryptograms may be generated by the merchant validation server and stored to the cryptogram validation database. For example, a first partial cryptogram may be generated using account and event-specific information. The first partial cryptogram may then be used to generate a second cryptogram by encrypting the first partial cryptogram and combining the results (e.g., performing a logical operating or concatenation) of the first partial cryptogram with an authorization code, for example. The validation cryptogram database then stores both the first partial cryptogram and the second (full) cryptogram for later computation and comparison.

Cryptograms may be partially generated by a point of validation terminal and partially by a venue validation server. Benefits to this embodiment are that more sensitive data may be stored only on the venue validation server, rather than on point of validation terminals which may be numerous. For example, there may be dozens or even hundreds of point of validation terminals at a given event. It would be more secure to store more sensitive data only on a centralized server, instead of on the point of validation terminals, which may be easily lost, misplaced, or stolen.

In another embodiment, a first hash value is generated when the consumer buys a ticket and a second hash value is generated when the consumer swipes his card at the event gate. If the first and second hash values match, the consumer is allowed into the venue. The hash values are calculated based on the card number and expiration date, merchant ID, event data (event, location, date, time, etc.) and a transaction-specific authorization number. Transaction-specific input data is desirable because it makes the transaction more secure.

Hashes may be calculated by ticket hash module. The hash module comprises a computer-readable medium, including code executable by a processor, for generating a hash output. In one embodiment, the Secure Hash Algorithm (e.g., SHA-256) is implemented on the computer-readable medium; however, any suitable algorithm can be used to create the hash. After the hash values associated with each ticket purchase are calculated, they are stored in a validation hash database. It can be more secure and beneficial to generate the hash on the validation hash database because the distribution of sensitive information, such as credit card number and expiration date, etc., is limited.

Multiple hash values may be created by a ticket hash module. In one embodiment, a first hash is calculated using a merchant ID, location ID, event ID, event date, and an authorization code for the transaction. The authorization code may be transaction-specific. The location ID, event ID and event date may be event specific. The merchant ID may be merchant- or merchant location-specific. A second hash is calculated using information associated with a portable consumer device, such as the PAN, credit card number and expiration date. In one embodiment, a second hash is calculated using the first hash in combination with information associated with a portable consumer device, such as the PAN, credit card number and expiration date. In one embodiment, the second hash is derived from the first hash. Therefore, a first hash and a second hash value are created and associated with each ticket purchase transaction by consumers using their portable consumer devices. The first hash and second hash values for each ticket purchase transaction are stored on a ticket server in a table or other suitable format for retrieval and comparison.

The ticket server may be communicatively coupled to an event server by a network. Alternatively, information from the ticket server is sent or downloaded to the event server. In one embodiment, the information from the ticket server is sent or downloaded to the event server before the audience or spectators are permitted to enter the event. In another embodiment, the ticket server and the event server are the same server or system of servers. The event server may be located at the venue where the event is located, or it may be offsite but communicatively coupled to a computer system at the venue.

In one embodiment, the information sent to the event server comprises hash values associated with ticket purchase transactions. The hash values may be stored in a table or any other format where the hash values associated with each transaction can be identified by a computer. When a consumer scans his or her portable consumer device at the event gate reader, the portable consumer device is authenticated and validated against information stored at the server. The portable consumer device is authenticated by generating a hash value and comparing it against the hash value generated by the ticket server. An event hash (i.e., a hash that is generated at the event for comparison and validation purposes) may be generated using a hash module. If the hash generated at the event server by the hash module corresponds to a hash generated by ticket server, the consumer is allowed entry into the event.

In one embodiment, the hashes generated by the hash module on the ticket server are transferred to the event gate reader (or any device that is capable of receiving an access permissions message, for example). The event gate reader may include the hash module. When the portable consumer device is scanned at the event gate reader, the hash module generates a hash value based on the portable consumer device and other information. The event gate reader compares it to the hash value stored on the event gate reader, which was generated by the hash module when the consumer bought tickets at the purchase terminal. If the hash generated at the event gate reader corresponds to a hash generated by ticket server, the consumer is allowed entry into the event. A hash value may be different from an encrypted value in that a hash function does not necessarily use an encryption process, whereas an encrypted value is generated using encryption, usually with a key. A hash function may be a one-way function, whereas encryption is typically a two-way function (e.g., encrypt plain text and decrypt cipher text).

Merchant Validation Server

Figure 7:
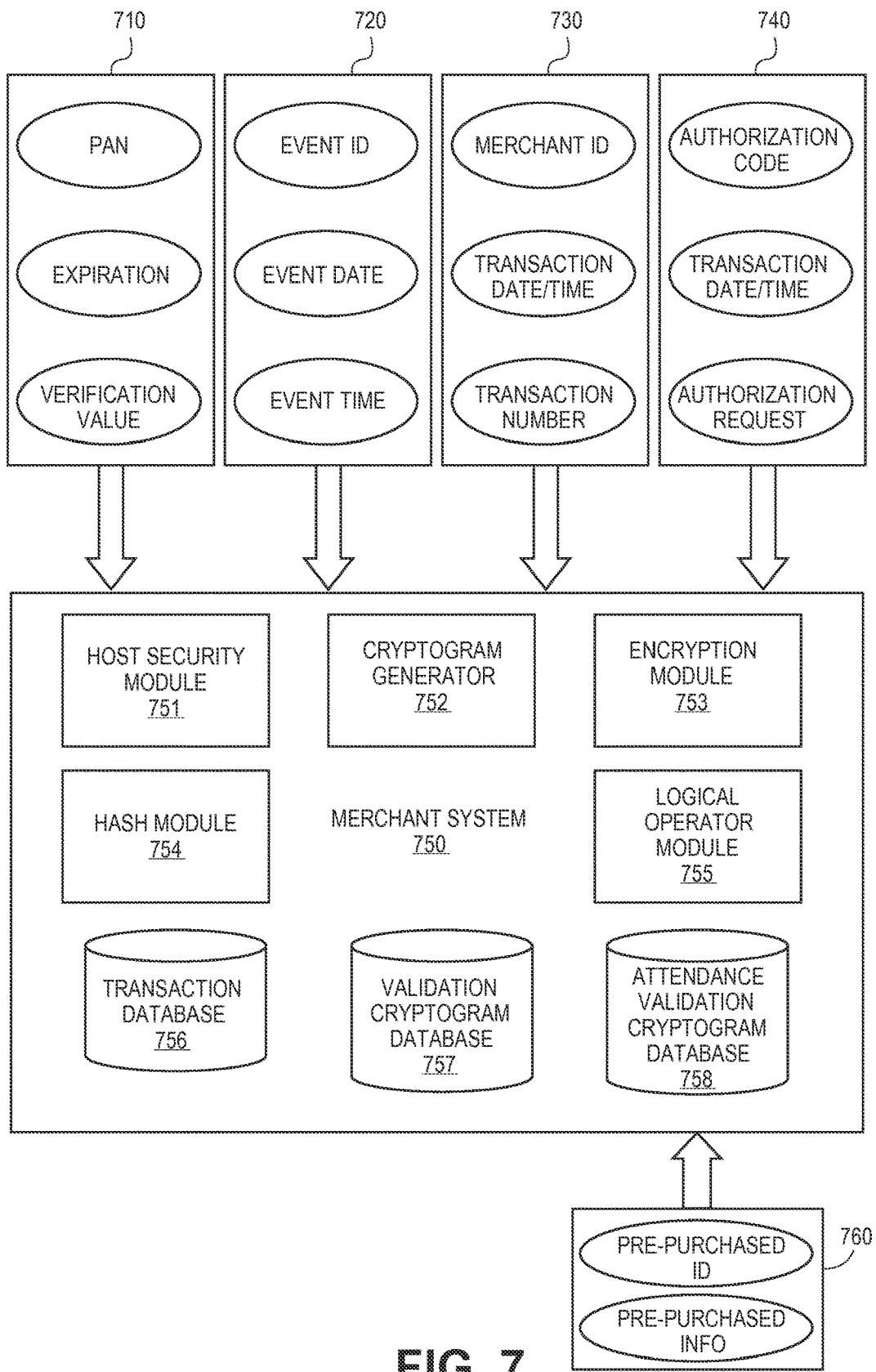
FIG. 7 shows a block diagram of a merchant validation server in accordance with an embodiment of the present invention.

FIG. 7 illustrates a block diagram of a server for generating validation cryptograms. Though a merchant validation server 750 is shown, it is appreciated that the merchant validation server 750 could be a venue validation server. The merchant validation server 750 generates a validation cryptogram during or after the original purchase transaction and stores the validation cryptogram into a validation cryptogram database 757. A venue validation server may later recreate the validation cryptogram in a similar manner for comparison purposes at the event.

Inputs to the merchant validation server may include account information 710, event information 720, merchant information 730, payment network information 740 and/or items pre-purchased. Account information 710 may include information about an account associated with a consumer and maintained by an issuer. Account information 710 may include information about a portable consumer device that is associated with the account. For example, account information 710 may include a primary account number (PAN), credit/debit card number, expiration date, card verification value (e.g., CVV, dCVV, CID), hardware identifier (e.g., SIM card number), or other suitable information that uniquely identifies the portable consumer device or the account.

Event information 720 may include information that uniquely identifies an event and/or its date/time, such as an event identifier (EID), event date, original event date, event time, or other information that describes the event. Event information may also comprise event options, such as the number of tickets to purchase, the seating location, or special add-ons.

Merchant information 730 may include a merchant identification number (MID). The MID uniquely identifies the merchant and may be a unique identification provided to the merchant by the electronic payment transaction acquiring entity. MID may be assigned by an acquirer, event promoter, or a third-party entity providing the ticketing solution as a service to multiple ticketing sales organizations and event promoters. In some embodiments, there could be other merchant-type fields involved.

Payment network data 740 includes data that is provided by a payment processing network. In one embodiment, payment network data 740 may include an authorization code, authorization request message, authorization response message, or transaction time/date.

The payment processing network may include data processing subsystems, networks, and operations used to support and deliver authorization services, exception file services, and clearing and settlement services. An example payment processing system may include VisaNet™. Payment processing systems such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network may include a server computer. A server computer is typically a powerful computer or cluster of computers. For example, the server computer can be a large mainframe, a minicomputer cluster, or a group of server computers functioning as a unit. In one example, the server computer may be a database server computer coupled to a Web server computer. The payment processing network may use any suitable wired or wireless network, including the Internet.

Merchant system 750 may comprise one or more of the following: host security module (HSM) 751, cryptogram generator 752, encryption module 753, hash module 754, logical operator module 755, transaction database 756, validation cryptogram database 757, and/or merchandise database 758. Each of these elements may be in operative communication with one another through a series of communication buses (not shown).

The merchant validation server (MVS) may include one or more host security modules (HSM) 751 running specialized applications. The HSM 751 may be an NIST (FIPS-140) approved tamper resistant security appliance used for the acceleration of cryptographic algorithms necessary to implement the validation cryptogram calculation. The HSM may also be used for the secure key generation, storage, and distribution management of security keys, such as an event derivation key. One or more of the modules shown may include a random number generator and/or key generator for generating random numbers and encryption keys. Random numbers generated may be used as a cryptographic salt value (i.e., as input in a key derivation function).

A hardware security module may be a type of secure cryptoprocessor that can manage digital keys, accelerate cryptoprocesses, and provide for strong authentication to access critical keys for server applications. These modules may be internal or external hardware devices that can be directly attached to, or contained within, a server or general purpose computer. HSMs may have the following capabilities: onboard secure generation, onboard secure storage, use of cryptographic and sensitive data material, offloading application servers for complete asymmetric and symmetric cryptography. HSMs may provide both logical and physical protection of these materials from unauthorized use. Data contained in an HSM may include asymmetric key pairs (and certificates) used in public-key cryptography, symmetric keys, and other data. HSMs may have hardware cryptographic accelerators.

The cryptogram generator 752 may generate validation cryptograms as described herein. In one embodiment, the cryptogram generator 752 operates in conjunction with the encryption module 753. In one embodiment, the cryptogram generator 752 operates in conjunction with the hash module 754. For example, various hash value calculations may be performed, as described above. The hash module 754 may perform these operations. The logical operator module 755 may perform these operations.

The validation cryptogram database 757 stores a list of valid cryptograms. The database may be linked or otherwise associated with access permission, including the number of paid-for admissions or location of seats. The transaction database 756 stores information associated with transaction such as a transaction history. Merchandise database 758 may store information regarding pre-purchased items. Databases 756, 757, and 758 may be linked to one another so that specific transactions can be linked to specific validation cryptograms and to specific pre-purchased merchandise. For example, transaction database may store information regarding the pre-purchased items 760, including an identifier for the pre-purchased items and other information describing the pre-purchased items.

It is appreciated that merchant validation server 750 and venue validation server (not shown) may include any number of hardware and software elements, including those described herein and with respect to FIG. 9, below.

Point of Validation Terminal

Figure 8:
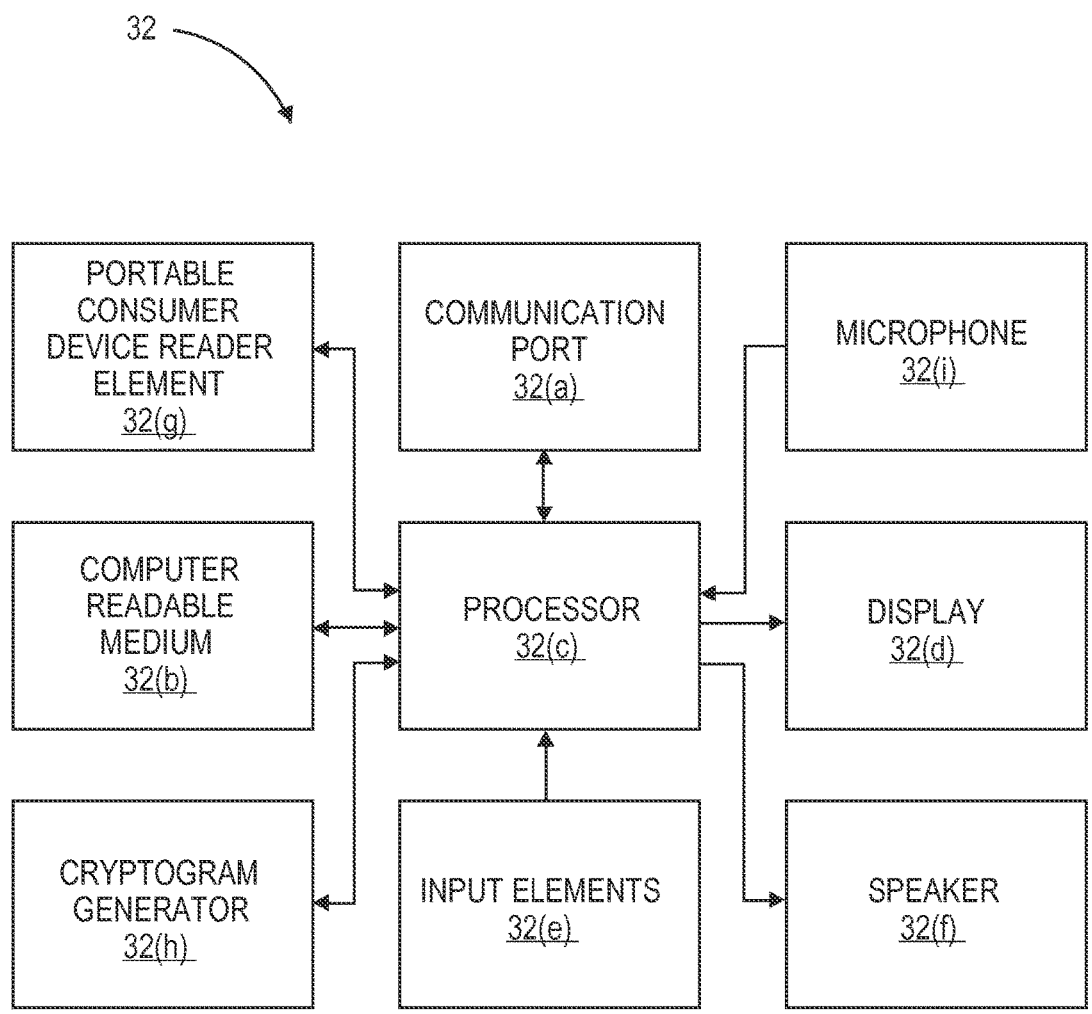
FIG. 8 shows a block diagram of a point of validation terminal in accordance with an embodiment of the present invention.

In FIG. 8, a point of validation terminal 32 may comprise a computer-readable medium and a body. FIG. 8 shows components of a point of validation terminal, such as the PVTs shown in FIG. 1 (140), according to one embodiment of the present invention. (FIG. 9 shows a number of components, and the mobile devices according to embodiments of the invention may comprise any suitable combination or subset of such components.) The computer-readable medium 32(b) may be present within the body (not shown), or may be detachable from it. The body may be in the form a plastic substrate, housing, or other structure. The computer-readable medium 32(b) may be a memory that stores data and may be in any suitable form including a magnetic stripe, a memory chip, uniquely derived keys, encryption algorithms, etc. In one embodiment, the computer-readable medium 32(b) includes a validation cryptogram database that contains valid cryptograms, which may be associated with access permissions. Access permission may include a number of people to admit, section/room/seat identifiers, or other information describing the level of access that a consumer is entitled to.

In one embodiment, in stadiums with an exclusive sector for consumers who use the disclosed technology, those who use their portable consumer devices are able to enter through a specific turnstile, shortening their wait time. Additionally, these consumers may have pre-assigned seats. These seats can be differentiated from the general admission seats, which require waiting in line. Additionally, these pre-assigned seats may be located in a more desirable section of the stadium. There may be special access clubs for these consumers.

The point of validation terminal 32 may further include a portable consumer device reader element 32(g). The portable consumer device reader element 32(g) may comprise a magnetic stripe reader, contactless reader, smart card reader, or the like. Portable consumer device reader element 32(g) may be capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth, infra-red, or other data transfer capability that can be used to exchange data between the point of validation terminal 32 and an interrogation device. Thus, the point of validation terminal 32 is capable of communicating and transferring data and/or control instructions via both a cellular network and a near field communications line or network. The point of validation terminal 32 may be implemented in the form of a semiconductor chip (or other data storage element) with an associated wireless transfer (e.g., data transmission) element, such as an antenna.

The point of validation terminal 32 may also include a processor 32(c) (e.g., a microprocessor) for processing the functions of the point of validation terminal 32 and a display 32(d) to allow a user to see phone numbers and other information and messages. The point of validation terminal 32 may further include input elements 32(e) to allow a user to input information into the device, a speaker 32(f) to allow the user to hear voice communication, audio tones, music, etc., and a microphone 32(i) to allow the user to transmit her voice through the mobile device 32. The mobile device 32 may also include a communication port 32(a) for wireless data transfer (e.g., data transmission), such as an antenna.

The point of validation terminal 32 may also include a cryptogram generator 32(h), which can generate validation cryptograms as described herein. For example, cryptogram generator 32(h), alone or in combination with other components, may generate a validation cryptogram as part of the validation cycle. The cryptogram generator 32(h) may contain, or be in operative communication with, a validation cryptogram database that contains valid cryptograms, which may be associated with access permissions.

The one or more point of validation terminals (PVTs) 140 may be compliant with EMVCo, PCI DSS and PCI PA-DSS specifications and requirements. PVT 140 may be used to read portable consumer devices (credit cards, debit cards, smart cards, mobile devices, keychain fobs, etc.) at a venue point of entry. In one embodiment, the PVT 140 may calculate the PVC value at a venue point of entry. In one embodiment, a copy of the validation cryptogram database (which contains valid validation cryptogram values) is stored locally on the PVT 140. Advantages to this embodiment include that the PVT 140 can execute a stand-alone and offline internal validation of the validation cryptogram value.

In another embodiment, the PVT 140 communicates with a VVS and/or an MVS, which will then validate the PVC value calculated by the PVT against a database of valid PVC values originally generated by an MVS during the original purchase payment transaction processing. In other embodiments, the PVT 140 calculates a partial cryptogram and sends it to the WS and/or MVS for further calculation and approval.

Point of validation terminal 140 may be in operative communication with the venue validation server. In one embodiment, the communication protocol to be used between the point of validation terminal (PVT) and the venue validation terminal (WS) or merchant validation server (MVS) may be TCP/IP and SSLv3/TLS1.0. Session resumption may be limited to 24 hours. AES-128 encryption based on the PDK may be used to protect the data field contents of all transactions except for the logon, during which the Diffie-Hellman Key Agreement Method may be performed to synchronize the PCT derivation key (PDK) between the PVT and the WS or MVS.

In one embodiment, communications between a point of validation terminal (PVT) and a merchant validation server (MVS) and/or a venue validation server (WS) may be secured using encryption. In one embodiment, a PVT derivation key (PDK) is used to protect communications between a PVT and a VVS and/or MVS. AES-128 encryption may be used to encrypt communications using the PVT derivation key. In one embodiment, when a PVT is powered up, the PVT and the WS and/or MVS are synchronized via a logon transaction using the Diffie-Hellman Key Agreement Method.

In one embodiment, an extensible mark-up language with syntax, such as XML, may be used for the communications between the point of validation terminal and the venue validation terminal. XML may be used for various communications/transactions, including a secure log in a transaction where the point of validation terminal logs onto the venue validation server to initiate communication, a key exchange transaction to ensure all communications between point of validation terminal and venue validation terminal are secure, and a ticket authentication transaction to determine whether a portable consumer device is associated with a paid admission.

Point of validation terminals or venue validation servers may be preprogrammed with event-specific data and/or merchant data to calculate validation cryptogram values. For example, at a specific-event, any valid cryptogram may have been generated using the event-specific information for that particular event. Therefore, the point of validation terminals or venue validation servers may be programmed with the event-specific data so that the particular event-specific data can used in each validation cycle.

Using the information read at the point of validation terminal, the point of validation terminal and/or the venue validation server (or merchant validation server) calculates a validation cryptogram. If the validation cryptogram generated during the purchase cycle matches the validation cryptogram generated in the validation cycle, the consumer and his or her guest are admitted.

Embodiments of the present invention offer increased convenience to consumers. Additionally, embodiments of the invention increase sales revenues of merchants and venues because it is easier and more convenient for the consumer to purchase merchandise. This also leads to increased consumer satisfaction and increased loyalty from the consumer. Embodiments of the present invention also allow venue operators and merchandise sellers to more accurately estimate the inventory needs of merchandise and food, as well as staffing needs.

Embodiments of the present invention offer many technical advantages, including increased security. Portable consumer devices contain sensitive personal and financial information, and validating portable consumer devices, even in a non-financial setting, requires that computer systems contain information that will permit validation and authentication of the portable consumer device. For example, one method of validation portable consumer devices might involve maintaining a list of all primary account numbers that have purchased admission to an event and/or event merchandise on a server at the venue or on each gate or turnstile device. This, however, could compromise sensitive personal and financial data. Therefore, an advantage to embodiments of the present invention is that personal and financial data is secured by encryption, hashing, and other operations and pre-order data may be linked to that encrypted, hashed, or otherwise secured data. In this way, personal and financial data is more secure in transit (between ticket seller and venue operators, for example) and in storage (on the ticker seller's servers and the venue's servers or entrance terminals/devices). Accordingly, embodiments of the present invention allow for more limited distribution of "plain text" sensitive information.

Embodiments of the present invention offer increased computation speed during the validation cycle. It is desirable for tickets to be validated at an event venue as quickly as possible because otherwise long lines may form. Rather than storing a large data set associated with portable consumer device holders that are entitled to access, certain embodiments of the present invention can use hashing and other data manipulation techniques to reduce the amount of data that needs to be stored at the venue. This allows for fast validation and for the possibility of offline validations (e.g., without the need to query a remote server with portable consumer device information) using point of validation terminals at a large number of entrances.

FIG. 9 is a high level block diagram of a computer system that may be used to implement any of the entities or components described above (e.g., merchant validation server, venue validation server, and point of validation terminal, etc.). The subsystems shown in FIG. 9 are interconnected via a system bus 945. Additional subsystems such as a printer 944, keyboard 948, fixed disk 949, monitor 946, which is coupled to display adapter 982, and others are shown. Peripherals and input/output (I/O) devices, which couple to I/O controller 941, can be connected to the computer system by any number of means known in the art, such as serial port 984. For example, serial port 984 or external interface 981 can be used to connect the computer apparatus to a wide area network such as the Internet, a mouse input device, or a scanner. The interconnection via system bus 945 allows the central processor 943 to communicate with each subsystem and to control the execution of instructions from system memory 942 or the fixed disk 949, as well as the exchange of information between subsystems. The system memory 942 and/or the fixed disk 949 may embody a computer-readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

The above description is illustrative and is not restrictive. Many variations of the technology will become apparent to those skilled in the art upon review of the disclosure. The scope of the technology should, therefore, be determined not with reference to the above description, but instead should be determined with reference to the pending claims along with their full scope or equivalents.

One or more features from any embodiment may be combined with one or more features of any other embodiment without departing from the scope of the technology.

A recitation of "a", "an" or "the" is intended to mean "one or more" unless specifically indicated to the contrary.

It should be understood that the present technology as described above can be implemented in the form of control logic using computer software in a modular or integrated manner. Based on the disclosure and teachings provided herein, a person of ordinary skill in the art will know and appreciate other ways and/or methods to implement the present technology using hardware and a combination of hardware and software.

What is claimed is:

1. A method comprising:
   receiving, at an event terminal comprising a processor at a venue hosting an event, portable consumer device information comprising a primary account number (PAN) from a portable consumer device used by a user;
   validating, by the processor in the event terminal, the portable consumer device based on the received information by determining whether the portable consumer device was used to purchase one or more tickets to the event and allowing entrance to the event if the portable consumer device is validated, wherein validating comprises generating a first cryptogram using the received primary account number and event specific information associated with the event and then comparing the generated first cryptogram with a second cryptogram that was stored in a validation database after the purchase and before the event terminal received the PAN;
   allowing, by the processor in the event terminal, the user to enter the event;
   determining that the first cryptogram is associated with pre-purchase order information for a pre-purchase order for event merchandise or event services; and
   generating a notification regarding the event merchandise or event services after determining that the first cryptogram is associated with the pre-purchase order.

2. The method of claim 1, wherein the notification comprises an identifier for the pre-purchased merchandise.

3. The method of claim 2, wherein the notification comprises a ticket location associated with the one or more tickets.

4. The method of claim 1, wherein the event specific information includes an event identifier.

5. The method of claim 1, wherein the portable consumer device is a payment card.

6. The method of claim 1, wherein the step of determining comprises accessing a lookup file that links the first cryptogram with the pre-purchase order.

7. The method of claim 1, wherein the notification is displayed on the event terminal.

8. An event terminal at a venue hosting an event, the event terminal comprising:
   a processor; and
   a computer-readable storage medium coupled to the processor, the computer readable medium having program code stored thereon, the program code including instructions that, when executed by the processor of an event terminal, causes the processor to execute a method comprising:
   receiving portable consumer device information comprising a primary account number (PAN) from a portable consumer device used by a user;
   validating the portable consumer device based on the received information by determining whether the portable consumer device was used to purchase one or more tickets to the event and allowing entrance to the event if the portable consumer device is validated, wherein validating comprises generating a first cryptogram using the received primary account number and event specific information associated with the event and then comparing the generated first cryptogram with a second cryptogram that was stored in a validation database after the purchase and before the event terminal received the PAN;
   allowing the user to enter the event;
   determining that the first cryptogram is associated with pre-purchase order information for a pre-purchase order for event merchandise or event services; and
   generating a notification regarding the event merchandise or event services after determining that the first cryptogram is associated with the pre-purchase order.

9. The event terminal of claim 8, wherein the notification comprises an identifier for the pre-purchased merchandise.

10. The event terminal of claim 9, wherein the notification comprises a ticket location associated with the one or more tickets to the event.

11. The event terminal of claim 8, wherein the event specific information includes an event identifier.

12. The event terminal of claim 8, wherein the step of receiving portable consumer device is a payment card.

13. The event terminal of claim 8, wherein the step of determining comprises accessing a lookup file that links first cryptogram with the pre-purchase order.

14. The event terminal of claim 8, wherein the notification is displayed on the event terminal.

15. A system comprising:
   the event terminal of claim 8; and
   a merchandise server in communication with the event terminal.

16. The system of claim 15, further comprising a merchant server in communication with the event terminal.

17. The system of claim 15, further comprising a validation server in communication with the event terminal.

18. The system of claim 15, wherein the validation server and the event terminal are at the venue.

\* \* \* \* \*

UNITED STATES PATENT AND TRADEMARK OFFICE
CERTIFICATE OF CORRECTION

PATENT NO. : 10,185,919 B2
APPLICATION NO. : 13/691191
DATED : January 22, 2019
INVENTOR(S) : Lori Van Deloo and Zack Fuerstenberg It is certified that error appears in the above-identified patent and that said Letters Patent is hereby corrected as shown below:

In the Claims

In Column 24, Claim 12, Lines 36-37, please remove "the step of receiving portable consumer device" and insert -- the portable consumer device --

Signed and Sealed this
Eighteenth Day of June, 2019

Andrei Iancu
*Director of the United States Patent and Trademark Office*